(12) United States Patent
de Marcken et al.

(10) Patent No.: US 8,005,695 B2
(45) Date of Patent: Aug. 23, 2011

(54) BIAS OF QUERIES FOR MULTI-PASSENGER MULTI-ROUTE TRAVEL PLANNING

(75) Inventors: Carl G. de Marcken, Seattle, WA (US); Justin A. Boyan, Providence, RI (US)

(73) Assignee: ITA Software, Inc., Cambridge, MA (US)

( * ) Notice: Subject to any disclaimer, the term of this patent is extended or adjusted under 35 U.S.C. 154(b) by 1134 days.

(21) Appl. No.: 11/335,169

(22) Filed: Jan. 18, 2006

(65) Prior Publication Data

US 2007/0164726 A1 Jul. 19, 2007

(51) Int. Cl.
*G06Q 10/00* (2006.01)
(52) U.S. Cl. .......................................................... 705/6
(58) Field of Classification Search ....................... 705/6
See application file for complete search history.

(56) References Cited

U.S. PATENT DOCUMENTS

| | | | |
|---|---|---|---|
| 6,377,932 B1 * | 4/2002 | DeMarcken | 705/5 |
| 2003/0110063 A1 * | 6/2003 | Among et al. | 705/6 |
| 2003/0225600 A1 | 12/2003 | Slivka et al. | |
| 2004/0078251 A1 * | 4/2004 | DeMarcken | 705/5 |
| 2005/0086087 A1 * | 4/2005 | Razza et al. | 705/5 |
| 2005/0154622 A1 * | 7/2005 | Chopra | 705/5 |
| 2006/0106655 A1 * | 5/2006 | Lettovsky et al. | 705/6 |
| 2006/0206363 A1 * | 9/2006 | Gove | 705/6 |

OTHER PUBLICATIONS

Packer, Adrienne; "Commissioners approve rural site for heliport"; Las Vegas Review; Las Vegas, Nev.: Feb. 4, 2004.*
International Search Report, PCT/US2007/001257, Nov. 19, 2008.

\* cited by examiner

*Primary Examiner* — John W Hayes
*Assistant Examiner* — Kevin Flynn
(74) *Attorney, Agent, or Firm* — Fish & Richardson P.C.

(57) ABSTRACT

Determining multiple routes for multiple passenger groups, includes sending to a scheduler, multiple individual queries with a bias to produce individual solutions that meet joint travel requirements, merging results from the multiple individual queries to produce joint solutions for the passenger groups and returning the joint solutions.

31 Claims, 21 Drawing Sheets

Enter first passenger's trip

Passenger's name: _____

Segment 1: From: _____ To: _____ Date: _____

Segment 2: From: _____ To: _____ Date: _____

Segment 3: From: _____ To: _____ Date: _____

"click here to continue to next passenger"

Enter first passenger's trip

Passenger's name: Susan _____

Segment 1: From: DFW  To: NYC  Date: May 1
Segment 2: From: NYC  To: SFO  Date: May 5
Segment 3: From: SFO  To: DFW  Date: May 7
Segment 4: From: ___  To: ___  Date: ___

[click here if no more passengers]
[click here to add another passenger]

---

Date    Susan's trip

May 1    DFW to NYC
May 5    NYC to SFO
May 7    SFO to DFW

Edit second passenger's trip

Passenger's name: _____

Segment 1: From: DFW_  To: NYC_  Date: May 1
Segment 2: From: NYC_  To: SFO_  Date: May 5
Segment 3: From: SFO_  To: DFW_  Date: May 7
Segment 4: From: ___  To: ___  Date: ___

[click here if no more passengers]
[click here to add another passenger]

```
Date    Susan's trip

May 1   DFW to NYC
May 5   NYC to SFO
May 7   SFO to DFW

Edit second passenger's trip:

Passenger's name: Andrew_____

Segment 1: From: DFW_  To: NYC_  Date: May 1
        Segment 2: From: NYC_  To: DFW_  Date: May 5
        Segment 3: From: ____  To: ____  Date: ____
        Segment 4: From: ____  To: ____  Date: ____

[click here if no more passengers]
[click here to add another passenger]
```

FIG. 5

```
Date    Susan's trip     Andrew's trip

May 1   DFW to NYC       DFW to NYC
May 5   NYC to SFO       NYC to DFW
May 7   SFO to DFW       ---------

Specify shared travel requirements:
       May 1: DFW to NYC
       X  Travel together on same flights
       _  Share as much of trip as possible
       _  Depart at same time
       _  Arrive at same time
       _  Arrive at same airport May 5: Departure from NYC
       X  Depart same airport
       X  Depart at same time

[click to perform search]
```

86c
(FIG. 7B let CI = CombineIndices(PreviousCI, I)
add CI to CombinedIndices[i]
add AND(Graph[i-1][PreviousCI], ORNode[i][I]) to OR node
Graph[i][CI]) , cull from response index information from passengers G(1)
... G(i) that is not necessary for evaluation of the joint
preferences and requirements between those passengers
and passengers G(i+1) ... G(n), 90

|   | Combined | | | | Ann | | | | Bob | | |
|---|---|---|---|---|---|---|---|---|---|---|---|
|   | Cost | Hrs | Stops | | Cost | Hrs | Stops | | Cost | Hrs | Stops |
| 1 | $1200 | 30 | 5 | <details> | $600 | 22 | 2 | <details> | $600 | 10 | 3 |
| 2 | $1500 | 26 | 4 | <details> | $600 | 18 | 2 | <details> | $900 | 8 | 2 |

FIG. 14

Table 260 (1.):

| Total | Ann | Bob | Psgrs | Airports | Date | Airline | Times | Stops | Notes |
|---|---|---|---|---|---|---|---|---|---|
| $1200 | $600 | $600 | Ann | JFK->HNL | Mon, Sept 10 | AA | 5:30a-2:10p | 1 | |
| | | | Bob | LGA->LAX | Wed, Sept 12 | NW | 4:00p-7:00p | 1 | |
| | | | Bob | LAX->HNL | Fri, Sept 14 | AA | 1:10p-5:23p | 0 | |
| | | | Ann | HNL->JFK | Sun, Sept 16 | AA | 6:00a-7:30p | 1 | Ann and Bob depart HNL on same flight |
| | | | Bob | HNL->JFK | Sun, Sept 16 | mixed | 6:00a-9:00p | 2 | |

☐ show more solutions similar to this solution

Table 260' (2.):

| Total | Ann | Bob | Psgrs | Airports | Date | Airline | Times | Stops | Notes |
|---|---|---|---|---|---|---|---|---|---|
| $1300 | $600 | $900 | Ann | JFK->HNL | Mon, Sept 10 | AA | 5:30a-2:10p | 1 | |
| | | | Bob | LGA->LAX | Wed, Sept 12 | NW | 4:00p-7:00p | 1 | |
| | | | Bob | LAX->HNL | Fri, Sept 14 | NW | 2:00p-6:00p | 0 | |
| | | | Ann + Bob | HNL->JFK | Sun, Sept 16 | AA | 6:00a-8:50 | 1 | Ann and Bob on same flights |

☐ show more solutions similar to this solution

FIG. 15

|  | Airports | Date | Airline | Times | Stops |
|---|---|---|---|---|---|
|  | JFK->HNL | Mon, Sept 10 | AA | 5:30a-2:10p | 1 |
|  | HNL->JFK | Sun, Sept 16 | AA | 6:00a-7:50p | 1 |

| | Ann | Min Total |
|---|---|---|
| | $600 | $1200 |

<click to view matching joint solutions>

FIG. 16

BIAS OF QUERIES FOR MULTI-PASSENGER MULTI-ROUTE TRAVEL PLANNING

BACKGROUND

This invention relates to travel pricing, and more particularly to pricing for air travel using travel planning computer systems.

Travelers and travel agents pose air travel planning queries to computer travel planning systems (TPS), such as travel web sites, airline-specific web sites, or interfaces supplied by global distribution systems (GDSs) as used by travel agents. One type of query typically supported by travel planning systems is the so-called low-fare-search (LFS) query. In response to an LFS query these travel planning systems typically return a list of possible answers, each including flight and price information, although answers may also take other forms such as a pricing graph.

Most travel planning systems can answer LFS queries involving multiple passengers, returning answers in which all passengers travel on the same flights but in some cases use different pricings (fares), depending on seat availability and special discounts that may be available to some but not all passengers.

SUMMARY

Multiple passengers may wish to fly related trips that do not have exactly the same flights. For example, two travelers may wish to journey together to a destination but return at separate times. On the other hand, several different passengers may wish to journey from different origins to a common destination, possibly for a group vacation or family reunion. Traditional travel planning systems cannot plan such trips, because they only produce answers in which all passengers fly exactly the same flights for all portions of their journey.

According to an aspect of the present invention, a method, for determining multiple routes for multiple passenger groups, includes sending to a scheduler, multiple individual queries with a bias to produce individual solutions that meet joint travel requirements, merging results from the multiple individual queries to produce joint solutions for the passenger groups and returning the joint solutions.

The following are embodiments within the scope of the claims. The method includes processing a multiple passenger, multiple route (MPMR) query for a plurality of passenger groups to produce the multiple individual sub-queries. The MPMR includes a set of information for each passenger group, the set comprising origin and destination information and a set of joint travel requirements. A client system sends the MPMR query to a server that processes the MPMR query to produce the multiple individual queries. The server produces an interface that data is entered into and the server executes an algorithm to generate the individual queries and combines the individual solutions to produce the joint solutions. Each individual query is processed and a list of individual solutions is produced for each passenger group. Each of the lists is received, and combining individual solutions includes producing a cross-product of the lists of individual solutions to provide a list of potential joint solutions. Each of the lists is received, and combining individual solutions includes filtering the list of potential joint solutions to eliminate potential joint solutions from the list of potential joint solutions that violate joint travel requirements. The joint travel requirements include a requirement that multiple passenger groups with different trip segment origins or destinations share flights for some portion of a trip. The bias includes enhancing the set of flight schedules for a first one of the multiple passenger groups, by generating some itineraries with intermediate points determined from an individual query of a second, different one of the multiple passenger groups. The bias is a common bias that is applied across all individual queries.

According to an additional aspect of the present invention, a computer program product for determining multiple routes for multiple passenger groups, includes instructions to send to a scheduler, multiple individual queries with a bias to produce individual solutions that meet joint travel requirements, merge results from the multiple individual queries to produce joint solutions for the passenger groups, and return the joint solutions.

According to an additional aspect of the present invention, apparatus includes a processor, a memory and storage, storing a computer program product for determining multiple routes for multiple passenger groups. The computer program product includes instructions to send to a scheduler, multiple individual queries with a bias to produce individual solutions that meet joint travel requirements, merge results from the multiple individual queries to produce joint solutions for the passenger groups and return the joint solutions.

One or more aspects of the invention may provide one or more of the following advantages.

The techniques biases schedulers to ensure overlap of solutions that can be used in travel planning systems that use "itinerary-led" searching. In itinerary led searching, the TPS uses a flight scheduler program to generate flight combinations (itineraries) for each trip segment, and prices combinations of itineraries that form whole trips. However, MPMR queries with same-flight requirements or preferences can be problematic for itinerary-led TPSes if providing solutions in which the same flights would require one passenger to choose a substantially less convenient itinerary, because it is unlikely the TPSes flight scheduler would naturally produce such an itinerary. Biasing individual query increases the likelihood that the flight scheduler generates itineraries that meet joint travel requirements.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a diagram depicting a graph user interface for MRMP processing.

FIGS. 4A-4C are diagrams depicting the graph user interface of FIG. 3 in various stages of completion for MRMP processing.

FIG. 5 is a diagram depicting another graphical user interface for MRMP processing.

FIGS. 14-16 are diagrams depicting presentation interfaces.

DETAILED DESCRIPTION

Figure 1:
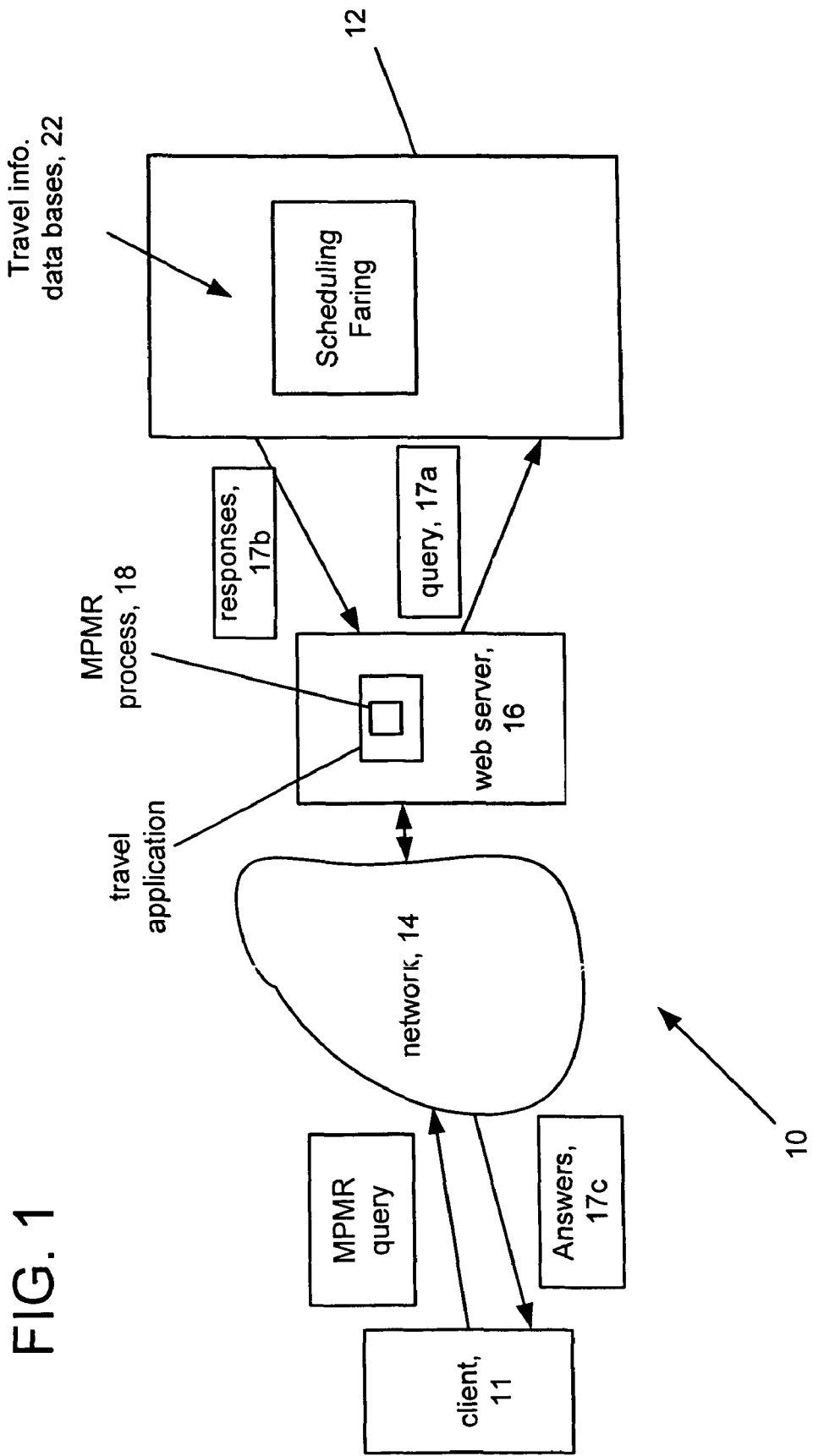
FIG. 1 is a block diagram including a travel planning system.

Referring to FIG. 1, an arrangement 10 includes a server type of computer system 12 implements a travel planning system (TPS) that searches for airline tickets in response to queries using so-called large scale or low-fare-search algorithms. The travel planning system 12 finds valid flight sequences between pairs of specified end-points in response to a query received from a client system 11. In one embodiment, the client 11 communicates with the travel planning system (TPS) 12 via a network such as the Internet 14 through a web server 16. One type of query handled by the travel planning system 10 relates to the joint planning of trips for multiple passengers, where the passengers wish to fly different, but co-dependent routes. Herein such travel planning will be referred to as MPMR (multi-passenger, multi-route) travel planning.

The client 11 sends an MPMR query to the web server 16 or directly to the travel planning system (TPS) 12. An MPMR process 18, here shown on the web server 16 uses an existing TPS 12 to solve MPMR queries, for example by posing multiple individual queries 17a and merges the responses 17b to produce answers 17c. In that example, the MPMR process 18 receives an MPMR query, and poses sub-queries 17a and possibly multiple sub-queries to the TPS 12 and integrates the results 17b prior to passing the integrated results as an answer 17c back to the client 11.

The process of finding flight sequences for a portion of a trip is commonly called "scheduling." Scheduling uses flight information contained in travel information databases, 22. A particular flight sequence for a portion of a trip is commonly called an "itinerary." Typically, the travel-planning system attempts 10 to find prices for one or more combinations of itineraries from each portion of a trip.

The process of finding prices for a specific combination of itineraries (equivalently, sequence of flights on a ticket) is known as "pricing" a set of flights, or "pricing a ticket" sometimes referred to as a faring process. The process of pricing the flights of a ticket involves retrieving fares from a fare database 22 and choosing fares for particular sub-sequences of flights such that all flights are paid for by exactly one fare. Pricing the flights can include grouping fares into priceable-units, and verifying that the fare rules permit the particular choices of fares and priceable-units.

A fare is a price an airline offers for one-way travel between two airports that has associated restrictions on its usage called "rules." If a fare's rules permit, a fare may pay for more than one flight, and tickets may be priced using more than one fare. In international travel, airlines publish fares in markets that often require many flights to get between a desired origin and destination.

MPMR travel planning can arise in many situations. For instance, a first traveler may need to travel NYC-HNL departing on a Monday and returning Sunday, and a companion may need to travel NYC-LAX on a Wednesday, LAX-HNL on a Friday and return HNL-NYC on Sunday with the first traveler sharing the same return flight and preferably sitting together.

As used below, "passenger group" (PG) refers to a group of one or more passengers that have the same travel requirements and travel together for their entire trip. In the following discussion, it may be necessary to distinguish between travel queries, requirements, preferences and solutions for a single passenger group and those for a combined set of all passengers groups involved in an MPMR travel query. The word "joint" refers to the properties of the MPMR travel query as a whole, and the word "individual" refers to a passenger group in isolation.

Another example can involve a large group of travelers, e.g., business travelers that originate travel from different origins but arrive and leave the destination at approximately the same times from the same airports, to simplify local travel arrangements. Another requirement could be that they share flights where possible. However these are preferences or "soft" constraints that may be violated, but at an implied cost, rather than requirements or "hard" constraints that may not be violated. Another example could involve two friends living in different cities that intend to meet at a common destination. They seek a destination that minimizes their combined travel costs. In all these examples different passengers' trips are co-dependent, either through hard constraints like that of sharing the same flights or destination, or soft constraints like that of arriving at approximately the same time or sharing flights if possible. To find the optimal trip combination for all passengers a travel planning system needs to consider all passengers' trips simultaneously.

Some common constraints and preferences for MPMR travel include: arriving or departing an airport at similar times; sharing all flights for a segment of a trip; sharing over-water or international flights for a segment of a trip; sharing as much mileage or time as possible for a segment of a trip; sharing origin or destination airports or cities; and avoiding the same flights.

The travel planning system responds to LFS queries that typically include origins and destinations, and travel times for each segment of a trip. One type of LFS query can be the MPMR query, discussed above. The MPMR process 18 receives the MPMR queries that are expressed as one set of information for each passenger group (an individual query, or IQ), a set of joint travel requirements, and optionally a specification of how to choose among solutions such as a joint preference function (as an example, "choose the joint solution that has the lowest total cost").

Figure 2:
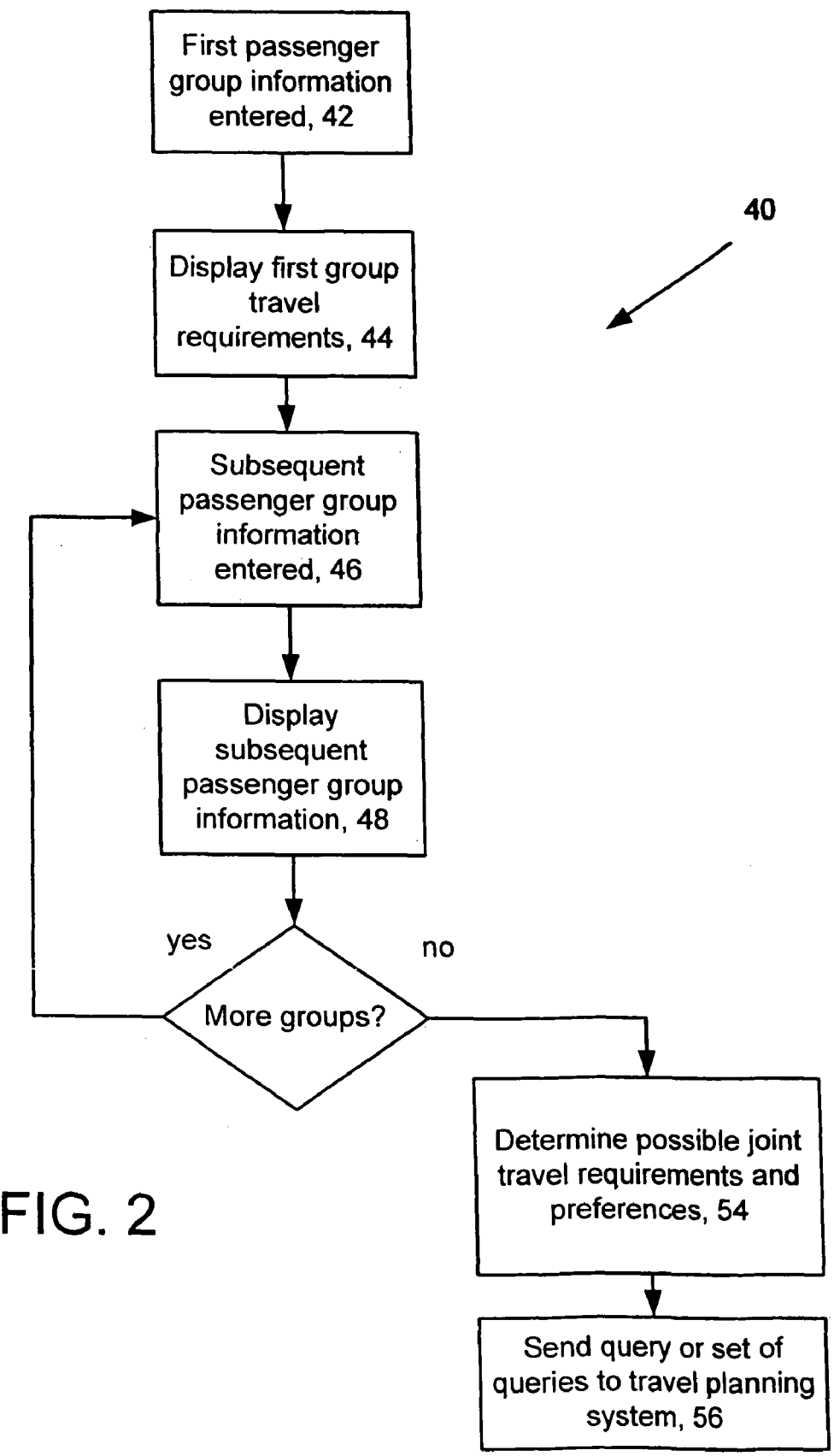
FIG. 2 is flow chart depicting multiple route multiple passenger processing.

Referring to FIG. 2, a process 40 to produce and process MPMR queries is shown. The first passenger group's travel requirements are entered 42 and the travel requirements are displayed 44. A similar form pre-populated 46 with data from preceding passenger groups is displayed 48 for a subsequent passenger group. That is, at this point, a form is produced for the second passenger group, pre-populated with the first passenger group's entries so that shared travel requirements need not be re-entered. In one embodiment the first passenger group's requirements remains editable, in another they are displayed in non-editable form for informational purposes only.

After the subsequent, e.g., second passenger group's travel requirements have been entered, the user is asked 50 if more passenger groups exist, and if so a new form is produced 46 and this is repeated as necessary until all passenger groups' individual queries have been entered. A set of possible joint travel requirements and preferences are deduced automatically 54 from the collection of individual queries. Optionally, the user is given a chance to verify and edit the joint travel requirements and preferences. Heuristics may be used to determine possible joint travel requirements and preferences. Some possibilities include:

A. If multiple passenger groups specify identical trip segment requirements (the same origins, destinations and travel times, for example) then it is assumed that they desire to fly together for that portion of their trip.

B. Unless A takes precedence, if multiple passenger groups specify the same destinations and travel times, but different origins, then it is assumed that they desire to arrive at the same destination airport at approximately the same time and if possible to share the same final flight.

C. Unless A takes precedence, if multiple passenger groups specify the same origins and travel times, but different destinations, then it is assumed that they desire to depart the same origin airport at approximately the same time and if possible to share the same initial flight. Thereafter, the process 40 can send 56 the query to the travel planning system, e.g., as a series of queries or a single query.

Travel queries are commonly posed by travelers using computer graphical user interfaces or browser based interfaces. It is desirable that a query interface for expressing MPMR travel queries be as simple to enter queries to minimizing the chance of entry error.

Referring now to FIG. 3, an exemplary user interface for entering MPMR travel queries includes an entry form 60, appropriate for an individual passenger group query displayed with an indication that the trip for the first passenger group should be entered. Fields are included for passenger names and segments of the trip.

FIGS. 4A-4C show the user interface of FIG. 3 with data entered for an MPMR query for two passenger groups of one passenger each. FIG. 4A shows that the first group requests a 3-component "circle trip," whereas FIG. 4B shows that first group trip and the second group trip pre-populated with the first group's trip. FIG. 4C shows a finished query, where the second passenger group data from FIG. 4B was edited such that the second passenger group joins the circle trip for only for the first part of the circle trip and includes a different segment for the reminder of its trip.

As shown in FIGS. 4A-4C, controls "click here to add another passenger," which brings up a screen to continue to the second or a subsequent passenger group and "click here if no more passengers," which exits the screen are provided.

The second or a subsequent passenger group form is displayed, initialized with the first passenger group's trip, and any other preceding group trips. Delete buttons (not shown) may be added to each trip segment to make editing easier, and the display of the first passenger group's trip may be modified so that it too is editable so that corrections can be made.

FIG. 4C, shows that the two passenger group's travel plans have been entered for this example. The travel plans are examined according to the heuristics described above. Running heuristic A determines that the two passengers may wish to travel together from DFW to NYC on May 1 and take the same flights. Heuristic C determines that both passengers may wish to depart the same NYC airport on May 5th at about the same time, if practical on the same flight. The user is asked to verify or edit these requirements and preferences in the interface, as shown in FIG. 5.

FIG. 5 depicts an interface that summarizes all of the trips and includes fields to allow a user to specify or verify shared travel requirements. The shared travel requirements can include for example travel together on same flights, share as much of trip as possible, depart at same time, arrive at same time, arrive at same airport, depart same airport, depart at same time, and so forth. The interface also includes a control to initiate a search. The interface can be arranged such that the requirements can be either specified as requirements or preferences, e.g., by adding requirement" vs "preference" choice to each possibility.

Other standard travel interface controls may be added. Such controls can include controls for specifying the number of stops and cabin class, and controls for specifying passenger composition of a passenger group. Controls for specifying passenger composition can be include controls to permit the user to enter the counts of various passenger types (adult, senior, child, etc), so that it is not necessary to enter every passenger separately for a group that intends to travel together for the entire trip.

In one alternative embodiment, joint travel requirements and preferences are specified incrementally after each passenger group's individual query has been entered. That is, the result shown in FIG. 5 is performed for each passenger group numbered 2 or higher generally immediately after that passenger group's trip information has been entered.

In addition to individual and joint travel requirements or preferences, controls may be added so that the user can specify how to prioritize joint solutions. For example, controls can allow the user to weigh total cost against total travel time and against meeting common travel preferences. In one example, a menu can be displayed at the stage depicted in FIG. 5 of several different preference functions.

In one alternative embodiment, the user interface does not include controls for specifying individual and joint travel requirements or preferences. Rather the controls specify heuristics. Such heuristics (A, B, C) are used to generate joint travel requirements and preferences without user verification. For example, if a heuristic A applies, then a joint travel preference function penalizes joint solutions that do not involve shared travel for the trip portion.

In addition to individual and joint travel requirements or preferences, controls may be added so that the user may specify how to prioritize joint solutions. For example, a control may be added to weight total cost against total travel time against meeting common travel preferences. For example, a menu of several different preference functions can be displayed at the stage depicted in FIG. 5.

Solving with Independent Searches

Although MPMR travel queries can be answered by a TPS that executes algorithms specialized for MPMR queries, it may be desirable to construct a system for responding to MPMR queries from an existing TPS that does not support MPMR queries. A system for responding to MPMR queries from an existing TPS could be used by a travel web site that desired to answer MPMR queries but did not have its own TPS and instead answered questions by posing queries to existing TPSes.

Figure 6:
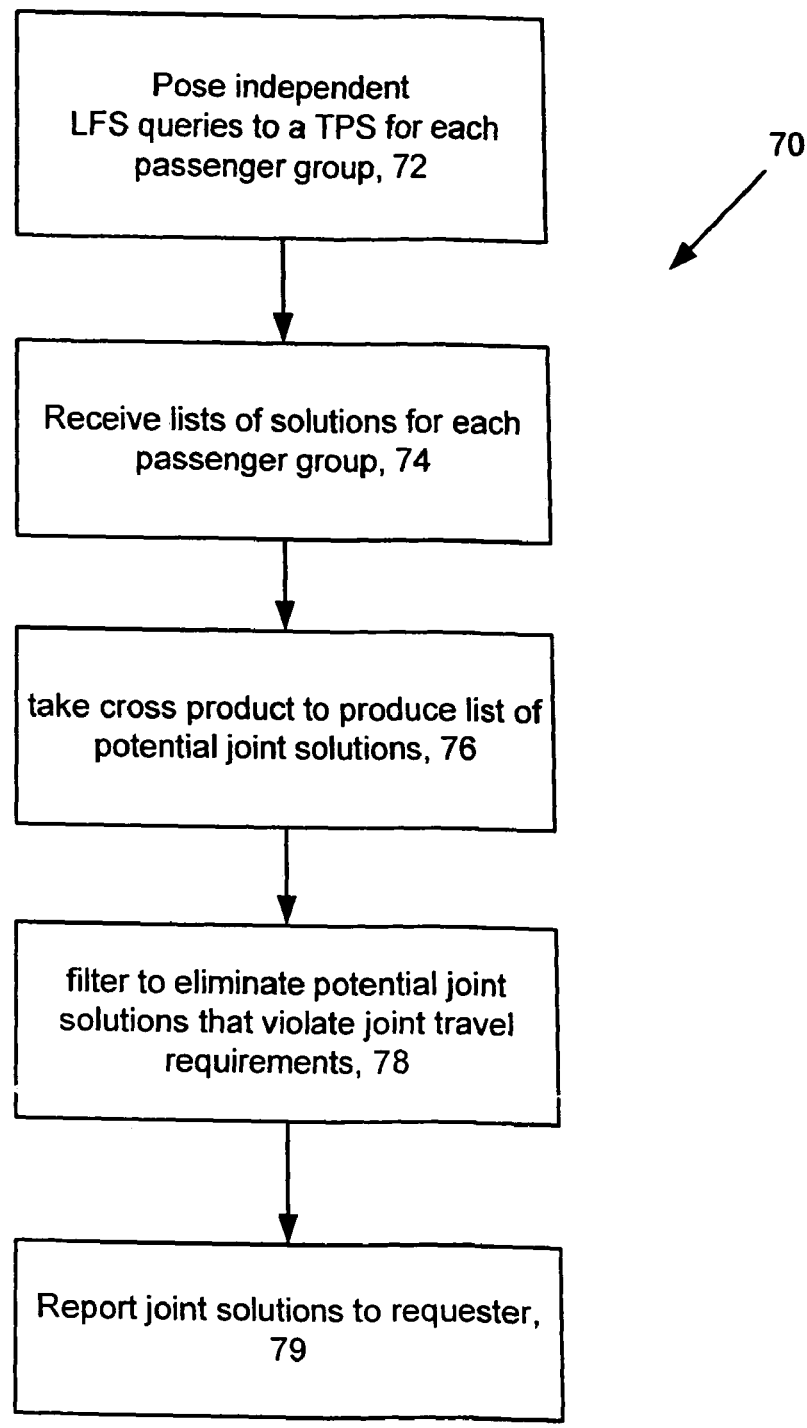
FIGS. 6-13 are flow charts depicting details of several different MRMP processing techniques.

Referring to FIG. 6, one technique 70 to solve MPMR travel problems is to pose 72 independent LFS queries to a TPS for each passenger group. Each query produces a list of individual solutions appropriate for the passenger group. The process 70 receives 74 these lists from, e.g., the TPS. These lists of individual solutions are combined to produce joint solutions. Combining of the joint solutions includes producing 76 a cross product of the lists of individual solutions to produce list of potential joint solutions, and filtering 78 the list of potential joint solutions to eliminate potential joint solutions that violate joint travel requirements. The joint solutions are reported 79 to the client 11.

However, producing a cross-product may consume excessive resources for constructing and filtering the list of potential joint solutions, since the number of potential (unfiltered) joint solutions is equal to the product of the number of individual solutions for each passenger group (thus polynomial in the number of individual solutions per passenger group and exponential in the number of passenger groups).

Another technique that avoids this problem is to index individual solutions according to those aspects of the solutions that are relevant for evaluating joint requirements or preferences. The TPS uses the indices rather than individual solutions to combine the individual solutions.

Figure 7:
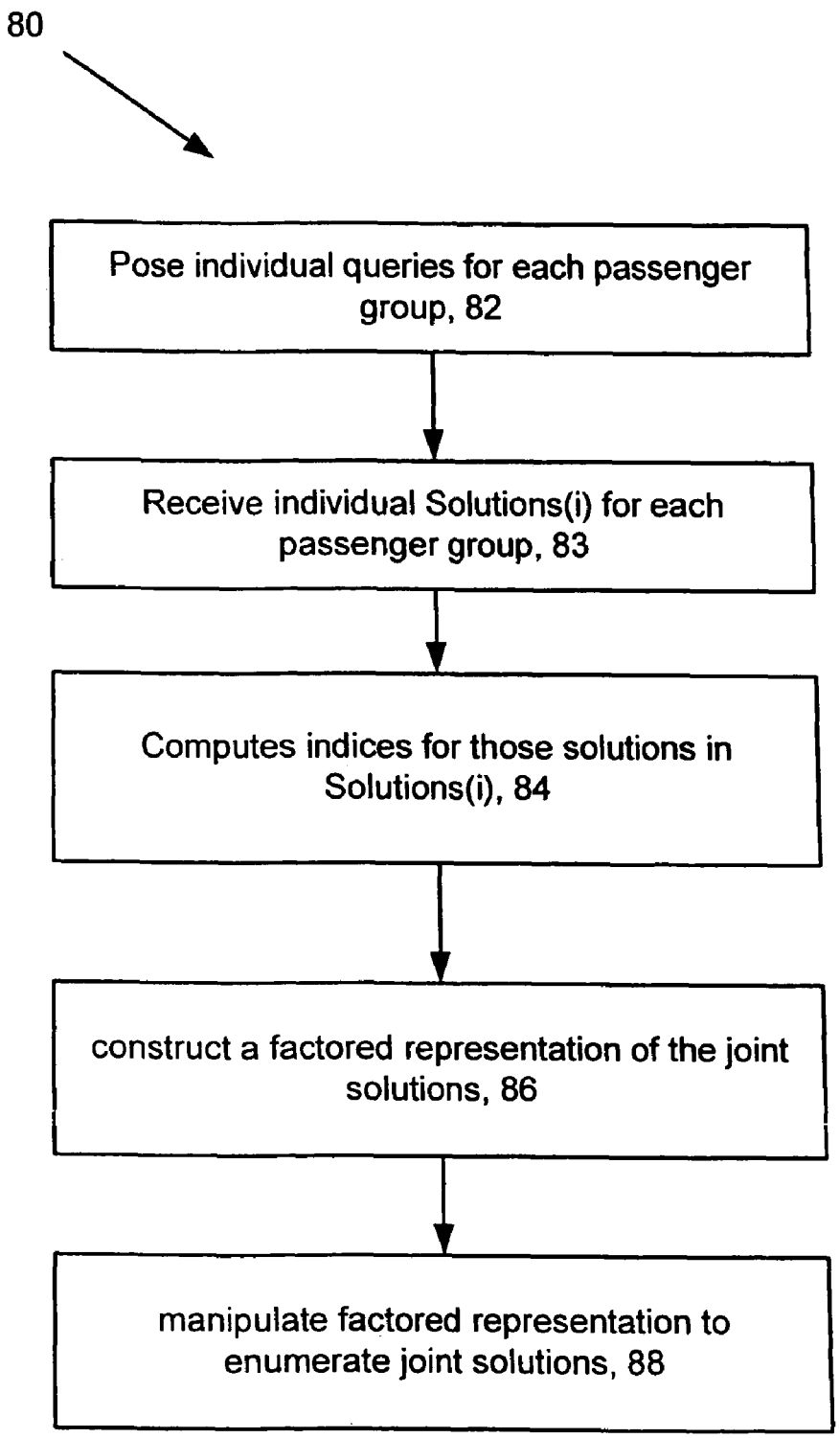

Referring to FIG. 7, a process 80 (also referred to as algorithm A below) to produce joint solutions is shown. Terminology used herein is taken from pseudo-code which appears subsequently. The process 80 poses 82 individual queries for each passenger group G(i), producing Individual Solutions(i) and receives 83 the Individual Solutions(i) for each passenger group. The process 80 computes 84 indices for those solutions in a solutions set, Solutions(i) and uses the indices to construct 86 a factored AND/OR graph representation of the joint solutions. The process 80 manipulates 88 the AND/OR graph representation to enumerate or otherwise manipulate joint solutions.

Figure 7A:
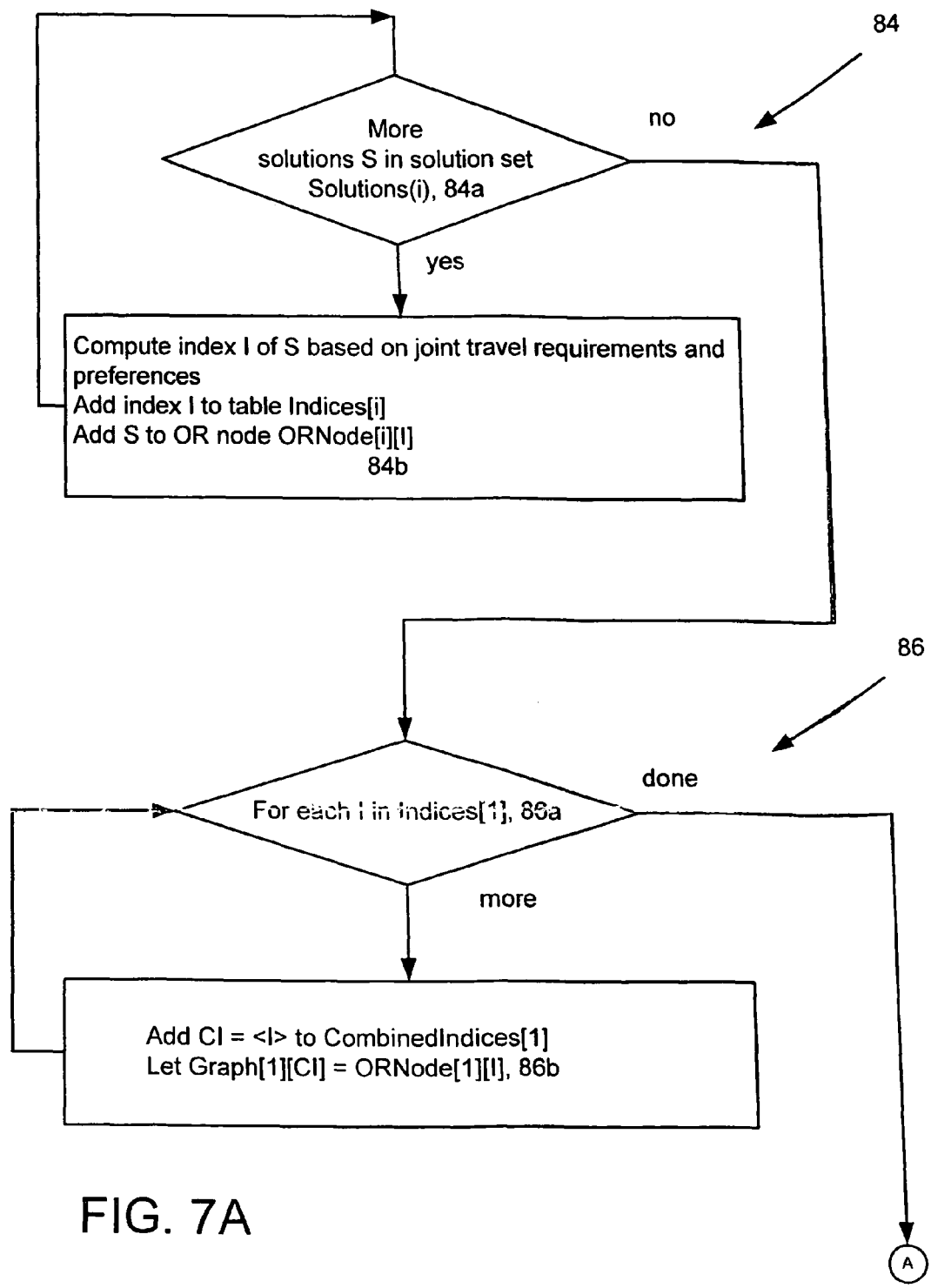
Figure 7B:
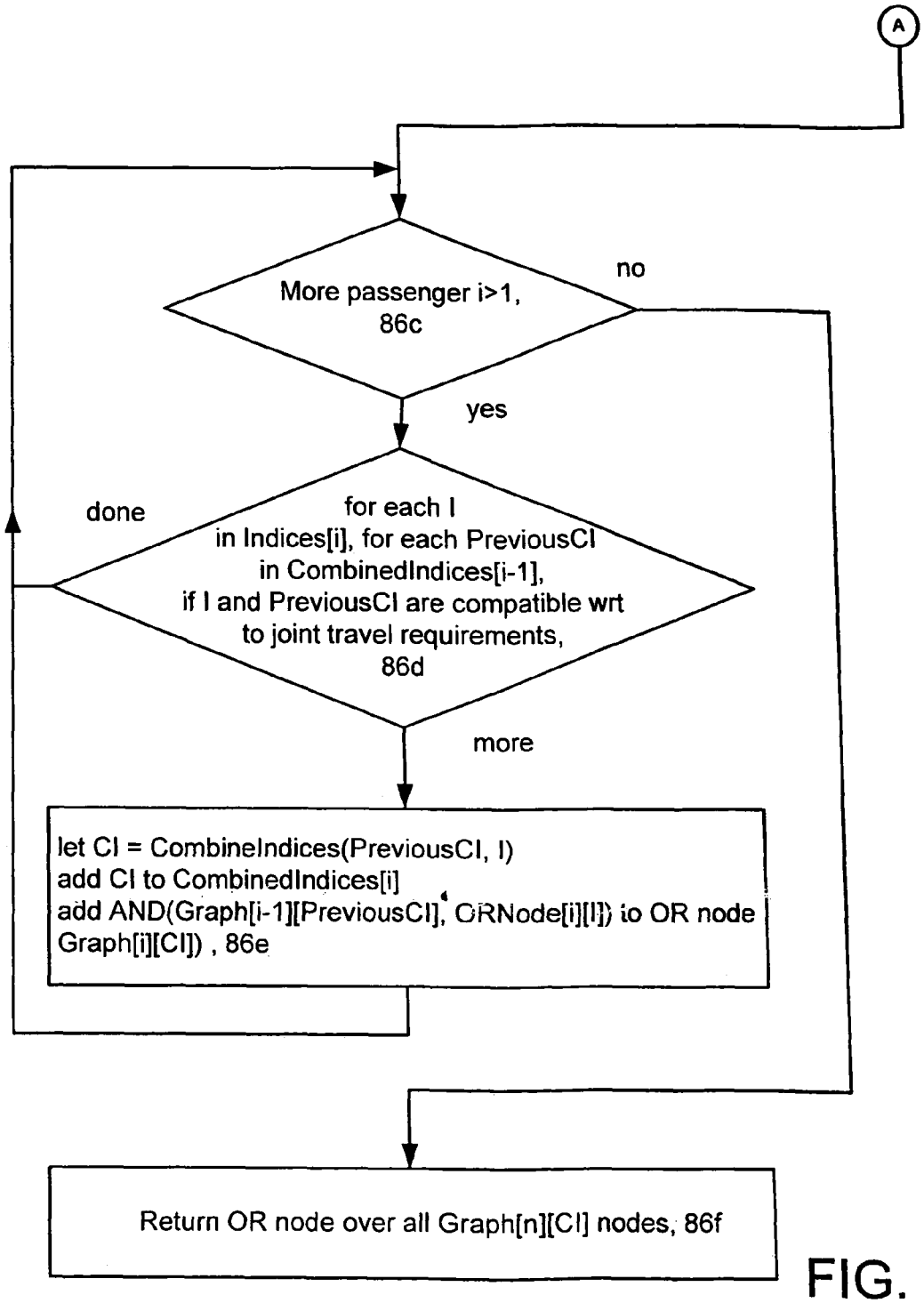

Referring to FIGS. 7A and 7B, details on computing 84 indices for the solutions in solutions(i) and constructing 86 a factored representation are shown. For computing 84 indices, for each solution "S" 84a in Solutions(i) the process 84, computes 84b an index I of S that is based on joint travel requirements and preferences. The process 84 adds the index I to table Indices(i) and adds "S" to an OR node "ORNode(i) (I)" to the table Indices(i) built from all solutions for group i of index I.

For each index I in the table Indices(l) 86a, the process 86 adds 86b CI=<I> to CombinedIndices(1). The process lets Graph(1) (CI)=ORNode(i) (I).

For each passenger i>1 86c, the process 86 tests 86d compatibility to the joint travel requirements. Thus, for each index I in Indices(i), and each combined index PreviousCI in CombinedIndicies(i−1) if PreviousCI and I are compatible with respect to joint travel requirements, the process 86 lets 86e CI=<PreviousCI+I>, adds CI to CombinedIndices(i) and adds AND(Graph(i−1)(PreviousCI)), ORNode(i)(I) to OR node Graph(i)(CI). The process 86 returns 86f OR node over all Graph(n)(CI) nodes.

Joint travel requirements and preferences are based on one or more of the following aspects (among other similar possibilities) of individual solutions:
1. departure airport for a trip segment
2. arrival airport for a trip segment
3. departure date and time for a trip segment
4. arrival date and time for a trip segment
5. first flight of a trip segment
6. last flight of a trip segment
7. all flights of a trip segment
8. as per 5-7, but operational flights (allowing different PGs to use different published airlines and flight numbers, in the case of code shares, so long as they are on the same airplane)

The information from an individual solution necessary for combining it with other individual solutions can be summarized by a list of tuples, as:
<TripSegment, Aspect, AspectValue>

For example, suppose a three-passenger group MPMR query is posed:

```
Passenger group 1:
    1. NYC->LAX May 12
    2. LAX->NYC May 17
Passenger group 2:
    1. NYC->LAX May 12
    2. LAX->SAN May 16
    3. SAN->NYC May 17
Passenger group 3:
    1. NYC->LAX May 12
```

The groups specify the following joint travel requirements:
All passenger groups depart the same NYC airport within two hours of one another and arrive within two hours of one another.

Passenger groups 1 and 2 arrive back in NYC on the same flight. The groups specify the following joint travel preferences:

All passenger groups depart the same NYC airport on the same flight.

For purposes of combining individual solutions, individual solutions can be indexed according to the following information, because this is the only information used by the joint travel requirements and joint travel preferences:

```
Passenger group 1:
    <1, "departure airport", VALUE>
    <1, "departure time", VALUE>
    <1, "first flight",   VALUE>
    <1, "arrival time",   VALUE>
    <2, "last flight",    VALUE>
Passenger group 2:
    <1, "departure airport", VALUE>
    <1, "departure time", VALUE>
    <1, "first flight",   VALUE>
    <1, "arrival time",   VALUE>
    <3, "last flight",    VALUE>
Passenger group 3:
    <1, "departure airport", VALUE>
    <1, "departure time", VALUE>
    <1, "first flight",   VALUE>
    <1, "arrival time",   VALUE>
```

If passenger group 1 has the following individual solutions

A.
1. EWR->LAX depart May 12 3:00 p, arrive May 12th 8:00 p (AA131)
2. LAX->EWR depart May 17 1:00 p, arrive May 12th 9:00 p (AA132)
B.
1. LGA->LAX depart May 12 3:30 p, arrive May 12th 8:20 p (UA100)
2. LAX->LGA depart May 17 9:00 a, arrive May 12th 7:00 p (UA15, UA27)
C.
1. LGA->LAX depart May 12 3:30 p, arrive May 12th 8:20 p (UA100)
2. LAX->LGA depart May 17 10:00 a, arrive May 12th 7:00 p (UA59, UA27)

then these would be indexed as follows:

| INDEX | SOLUTIONS |
|---|---|
| {<1, "departure airport", EWR><br><1, "departure time", 3:00 p><br><1, "first flight",AA131><br><1, "arrival time",8:00 p><br><2, "last flight", AA132>} | {A} |
| {<1, "departure airport", LGA><br><1, "departure time", 3:30 p><br><1, "first flight",UA100><br><1, "arrival time",8:20 p><br><2, "last flight", UA27>} | {B C} |

Joint travel requirements and preferences are expressed in terms of individual indices rather than individual solutions. For example, the requirement that passenger groups 1 and 2 arrive back in NYC on the same flight can be expressed as:

For <2, "last flight", VALUE1> in passenger group 1 index and <3, "last flight", VALUE2> in passenger group 2 index, require VALUE1 = VALUE2.

The requirement that all passengers depart the same NYC airport within two hours of one another can be expressed as:

For <1, "departure airport", VALUE1> in passenger group 1 index and <1, "departure time", VALUE2> in passenger group 1 index

```
and <1, "departure airport", VALUE3> in passenger group 2 index
and <1, "departure time", VALUE4> in passenger group 2 index
and <1, "departure airport", VALUE5> in passenger group 3 index
and <1, "departure time", VALUE6> in passenger group 3 index,
    require VALUE1 = VALUE3 = VALUE5 and max
(VALUE2,VALUE4,VALUE6) −
min (VALUE2,VALUE4,VALUE6) <= 2 hrs.
```

The preference that all passengers depart NYC on the same flight can be expressed as:

```
For <1, "first flight", VALUE1> in passenger group 1 index
and <1, "first flight", VALUE2> in passenger group 2 index
and <1, "first flight", VALUE3> in passenger group 3
index,
    if (VALUE1 != VALUE2) assess $50 penalty
    if (VALUE2 != VALUE3) assess $50 penalty
    if (VALUE3 != VALUE1) assess $50 penalty
```

Here $50 penalties are shown. However, different values or methods for penalizing solutions can also be used. Other index representations can be chosen, so long as they are able to summarize the information in individual solutions necessary to evaluate joint preferences and constraints.

Since all the information necessary to construct joint solutions is contained within the indices, it is possible to construct a factored representation of joint solutions by building a representation of all the possible combinations of individual solution indices, and linking from individual indices to those solutions with the index. One advantage of this algorithm over producing a cross-product of individual solutions is that it is much more efficient in space and time in the case where many individual solutions have the same indices.

One type of factored representation is an AND/OR graph that compactly represents a set of joint solutions. The AND/OR graph is manipulated using algorithms of de Marcken (U.S. Pat. No. 6,275,808) with a translation that terminal elements are individual solutions and joint preference violations. Joint preference functions are translated into the AND/OR graph formalism by constructing a value function that independently assigns values to individuals solutions that reflect the cost of that solution without regard to joint travel preferences, and also assigns values to joint preference violations, that reflect cross-passenger-group penalties. Details of such a technique are discussed below.

Thus, process 80, e.g., Algorithm A constructs a factored AND/OR graph that represents a multitude of joint solutions as combinations of individual solutions, where the structure of the graph is determined by the indices of individual solutions. From this AND/OR graph, algorithms closely analogous to the algorithms of de Marcken (U.S. Pat. No. 6,275,808) can be used extract one or more joint solutions, to list joint solutions in an order determined by a preference function, to determine the lowest joint price for any joint solution that has a particular individual solution, and so forth.

In Algorithm A sending individual queries to the TPS can be performed in parallel (concurrently), so as to reduce total latency of response.

Pseudo code for Algorithm A is set forth below:

```
define compute-AND/OR-graph
    input: passenger groups G(1) ... G(n)
        individual travel queries IQ(1) ... IQ(n)
        joint travel requirements JTR
        joint travel preferences JTP
    // initialize data structures
    for each i from 1 to n
      IndexTemplates(i) = ComputeIndividualSolutionIndexTemplate(JTR, JTP, i)
      let Indices(i) be set of all individual solution indices for G(i),
        each entry initialized to { }
      let Solutions(i)(I) be set of all individual solutions for G(i) with index I,
        each entry initialized to { }
      let ORNode(i)(I) be table of OR graph nodes representing choice over all
        solutions in Solutions(i)(I)
    // For each passenger group pose individual queries and group solutions into
    // OR nodes by index
    for each i from 1 to n // may be performed in parallel (concurrently)
      Solutions(i) = pose individual query IQ(i) for passenger group G(i) to TPS
      for each solution S in Solutions(i)
        let I = IndividualSolutionIndex(S, IndexTemplates(i))
        Solutions(i)(I) += S
        Indices(i) = union(Indices(i), { I })
      for each index I in Indices(i)
        let S = Solutions(i)(I)
        ORNode(i)(I) = ConstructORGraphNode(S(1), S(2), ...)
    // Working from passenger group 1 to n, calculate combined indices for
    // passenger groups 1 ... i by combining those indices for passenger group i
    // with the combined indices from steps 1 ... i−1; each combined index for
    // 1 ... i is represented by its own AND/OR graph node
    let CombinedIndices(i) be set of "combined indices" for G(1) ... G(i),
        where combined index CI = <I(1), ..., I(i)> represents conjunction of individual
        indices, each entry initialized to { }
    let Graph(i)(CI) be table of graph nodes indexed by the combined index CI
    for each I in Indices(1)
      CI = <I>
      CombinedIndices(1) += CI
      Graph(1)(CI) = ORNode(1)(I)
    for each i from 2 to n
      let ANDNodes(CI) be list of AND nodes for the combined index CI,
        each entry initialized to { }
      for each I in Indices(i)
```

-continued

```
    for each PreviousCI in CombinedIndices(i-1)
        GN = Graph(i-1)(PreviousCI)
        if CompatibleWithJointTravelRequirements(PreviousCI, I, JTR)
            let PV = CollectJointPreferenceViolations(PreviousCI, I, JTP)
            let CI = CombineIndices(PreviousCI, I)
            CombinedIndices(i) = union(CombinedIndices(i), { CI })
            ANDNodes(CI) += ConstructANDNode(GN, ORNode(i)(I), PV)
    for each CI in CombinedIndices(i)
        let A = ANDNodes(CI)
        Graph(i)(CI) = ConstructORNode(A(1), A(2), ...)
// Construct the final graph by combining the nodes for all combined indices
let G = { }
for each CI in CombinedIndices(n)
    G += Graph(n)(CI)
return ConstructORNode(G(1), G(2), ...)
define CombineIndices(PreviousCI, I(i))
    // PreviousCI = < I(1), ..., I(i-1) > is combined index for G(1)...G(i-1);
    // I(i) is index for passenger group G(i); combine by concatenating
    return < I(1), ..., I(i-1), I(i) >
define CompatibleWithJointTravelRequirements(PreviousCI, I(i), JTR)
    // PreviousCI = < I(1), ..., I(i-1 > is combined index for G(1)...G(i-1);
    // I(i) is index for passenger group G(i); JTR is specication of joint travel
    // requirements
    (Return True if I(i) is consistent with I(1) ... I(n); or conversely,
    return False if the joint requirements JTR are incompatible with I(1) ... I(i)
    regardless of the choice of indices for groups G(i+1) ... G(n).
define CollectJointPreferenceViolations(PreviousCI, I(i), JTP)
    // PreviousCI = < I(1), ..., I(i-1) > is combined index for G(1)...G(i-1);
    // I(i) is index for passenger group G(i) JTP is specification of joint travel
    // preferences
    (Produce and return list of travel preference violations involving passenger
    group G(i) and one or more of G(1) ... G(i-1), but not any of G(i+1) ... G(n).)
```

Algorithm A produces an AND/OR graph with individual solutions as terminals that represents through its structure the ways those individual solutions may be combined to provide joint solutions that satisfy the joint travel requirements.

Some of the solutions may violate joint travel preferences, but the function "CollectJointPreferenceViolations" can be used to determine joint preference violations by examining the individual solution indices for each passenger and comparing against the joint preferences, recording violations in a data structure.

CollectJointPreferenceViolations (CI, I(i), JTP) produces a list of violations of preferences involving passenger group G(i) and groups G(1) . . . G(i−1), but not any of G(i+1) . . . G(n).

In some circumstances, algorithm A is not necessarily the most efficient way to combine the indices of individual queries to produce a representation of the valid joint indices. This is particularly the case when there are three or more passenger groups that do not share all joint travel requirements. For example, suppose passengers A, B, C and D (a pair of couples) are planning a round-trip vacation in which all four wish to arrive at the destination within 2 hrs of one another, A and B demand to fly together outbound, and C and D demand to fly together outbound (there are no requirements or preferences on the return portion of the journey). The same-time preference forces all four passengers' trips to be planned jointly, but it is not necessary to consider the individual flights of A and B when planning the trip for C and D, only the outbound arrival time. In such a case, it is not necessary to accumulate all individual index information in combined indices.

Referring to FIG. 7C, a more computationally efficient process 90 can be provided by modifying the CombineIndices function of 86e (FIG. 7B) to provide a CombineIndices function 92 that can cull from its response index information from passengers G(1) . . . G(i) that is not necessary for the evaluation of the joint preferences and requirements between those passengers and passengers G(i+1) . . . G(n). In the example, this would enable arrival time information from passenger A to be culled after processing passenger B, flight information from passengers A and B after processing passenger B, and arrival time information from all passengers after processing passenger C.

As an example of algorithm execution, suppose that after the four individual queries were posed, the solutions returned for each passenger are as follows:

| | | Solutions: | | |
|---|---|---|---|---|
| Psgrs | Outbound | Arrival | Return | Price/psgr |
| 1 A, B | BOS->LAX UA100 | 5:30 pm | LAX->BOS UA300 | $520 |
| 2 A, B | BOS->LAX UA100 | 5:30 pm | LAX->BOS UA391 | $700 |
| 3 A, B | BOS->LAX UA125 | 5:30 pm | LAX->BOS UA391 | $700 |
| 4 A, B | BOS->LAX UA200 | 3:00 pm | LAX->BOS UA300 | $610 |
| 5 A | BOS->LAX UA200 | 3:00 pm | LAX->BOS UA391 | $500 |
| 6 C, D | MIA->LAX AA710 | 4:15 pm | LAX->MIA AA150 | $400 |
| 7 C, D | MIA->LAX AA900 | 1:10 pm | LAX->MIA AA150 | $400 |
| 8 C, D | MIA->LAX AA900 | 1:10 pm | LAX->MIA AA200 | $410 |

The individual indices for each passenger and the component solutions are as follows:

| Psgr | Index Name | Solutions | Index |
|---|---|---|---|
| A | A1 | 1, 2 | { <1, "arrival time", 5:30 pm>, <1, "flights", UA100> } |
| A | A2 | 3 | { <1, "arrival time", 5:30 pm>, <1, "flights", UA125> } |

| Psgr | Index Name | Solutions | Index |
|---|---|---|---|
| A | A3 | 4, 5 | { <1, "arrival time", 3:00 pm>, <1, "flights", UA200> } |
| B | B1 | 1, 2 | { <1, "arrival time", 5:30 pm>, <1, "flights", UA100> } |
| B | B2 | 3 | { <1, "arrival time", 5:30 pm>, <1, "flights", UA125> } |
| B | B3 | 4 | { <1, "arrival time", 3:00 pm>, <1, "flights", UA200> } |
| C | C1 | 6 | { <1, "arrival time", 4:15 pm>, <1, "flights", AA710> } |
| C | C2 | 7, 8 | { <1, "arrival time", 1:10 pm>, <1, "flights", AA900> } |
| D | D1 | 6 | { <1, "arrival time", 4:15 pm>, <1, "flights", AA710> } |
| D | D2 | 7, 8 | { <1, "arrival time", 1:10 pm>, <1, "flights", AA900> } |

If processing takes place from passenger A to passenger D, then after processing passenger A the combined indices are:

Combined Indices:

< { <1, "arrival time", 5:30 pm>, <1, "flights", UA100> } >
< { <1, "arrival time", 5:30 pm>, <1, "flights", UA125> } >
< { <1, "arrival time", 3:00 pm>, <1, "flights", UA200> } >

After processing passenger B, using the more naive form of the algorithm, the combined indices are:

< { <1, "arrival time", 5:30 pm>, <1, "flights", UA100> }, { <1, "arrival time", 5:30 pm>, <1, "flights", UA100> } >
< { <1, "arrival time", 5:30 pm>, <1, "flights", UA125> }, { <1, "arrival time", 5:30 pm>, <1, "flights", UA125> } >
< { <1, "arrival time", 3:00 pm>, <1, "flights", UA200> }, { <1, "arrival time", 3:00 pm>, <1, "flights", UA200> } >

However, in the more sophisticated "culling" version 90 the CombineIndices function 92 (FIG. 7C) drops non-relevant information from combined indices, e.g., information with respect to combination with subsequent passengers (e.g., flight information), producing the following smaller number of combined indices:

< { }, { <1, "arrival time", 5:30 pm> } >
< { }, { <1, "arrival time", 3:00 pm> } >

After processing passenger C, using the culling version of the process (process 90 FIG. 7C), the combined indices are:

< { }, { }, { <1, "flights", AA710> } >
< { }, { }, { <1, "flights", AA900> } >

The joint travel requirements prevent the combination of 1:10 arrivals for passenger C with 5:30 arrivals for passengers A and B.

With culling version of the CombineIndices function 92, the final AND/OR graphical representation is:

| Node | Type | Daughters | Represents |
|---|---|---|---|
| 1 | OR | Solution 1, Solution 2 | A index: { <1, "arrival time", 5:30 pm>, <1, "flights", UA100> } |
| 2 | OR | Solution 3 | A index: { <1, "arrival time", 5:30 pm>, <1, "flights", UA125> } |
| 3 | OR | Solution 4, Solution 5 | A index: { <1, "arrival time", 3:00 pm>, <1, "flights", UA200> } |
| 4 | OR | Solution 1, Solution 2 | B index: { <1, "arrival time", 5:30 pm>, <1, "flights", UA100> } |
| 5 | OR | Solution 3 | B index: { <1, "arrival time", 5:30 pm>, <1, "flights", UA125> } |
| 6 | OR | Solution 4 | B index: { <1, "arrival time", 3:00 pm>, <1, "flights", UA200> } |
| 7 | AND | Node 1, Node 4 | A&B combination |
| 8 | AND | Node 2, Node 5 | A&B combination |
| 9 | AND | Node 3, Node 6 | A&B combination |
| 10 | OR | Node 7, Node 8 | combined index: < { }, { <1, "arrival time", 5:30 pm> } > |
| 11 | OR | Node 9 | combined index: < { }, { <1, "arrival time", 3:00 pm> } > |
| 12 | OR | Solution 6 | C index: { <1, "arrival time", 4:15 pm>, <1, "flights", AA710> } |
| 13 | OR | Solution 7, Solution 8 | C index: { <1, "arrival time", 1:10 pm>, <1, "flights", AA900> } |
| 14 | AND | Node 10, Node 12 | A&B&C combination |
| 15 | AND | Node 11, Node 12 | A&B&C combination |
| 16 | AND | Node 11, Node 13 | A&B&C combination |
| 17 | OR | Node 14, Node 15 | combined index: < { }, { }, { <1, "flights", AA710 > } > |
| 18 | OR | Node 16 | combined index: < { }, { }, { <1, "flights", AA900 > } > |
| 19 | OR | Solution 6 | D index: { <1, "arrival time", 4:15 pm>, <1, "flights", AA710> } |
| 20 | OR | Solution 7, Solution 8 | D index: { <1, "arrival time", 1:10 pm>, <1, "flights", AA900> } |
| 21 | AND | Node 17, Node 19 | A&B&C&D combination |
| 22 | AND | Node 18, Node 20 | A&B&C&D combination |
| 23 | OR | Node 21, Node 22 | total graph |

Using the techniques discussed in (de Marcken, U.S. Pat. No. 6,275,808), it is possible to calculate for every node the number of solutions represented and minimum price of those solutions:

| Node | Type | Daughters | Num solutions | Min Price |
|------|------|-----------|---------------|-----------|
| 1 | OR | Solution 1, Solution 2 | 2 | $520 |
| 2 | OR | Solution 3 | 1 | $700 |
| 3 | OR | Solution 4, Solution 5 | 2 | $500 |
| 4 | OR | Solution 1, Solution 2 | 2 | $520 |
| 5 | OR | Solution 3 | 1 | $700 |
| 6 | OR | Solution 4 | 1 | $610 |
| 7 | AND | Node 1, Node 4 | 4 | $1040 |
| 8 | AND | Node 2, Node 5 | 1 | $1400 |
| 9 | AND | Node 3, Node 6 | 2 | $1110 |
| 10 | OR | Node 7, Node 8 | 5 | $1040 |
| 11 | OR | Node 9 | 2 | $1110 |
| 12 | OR | Solution 6 | 1 | $400 |
| 13 | OR | Solution 7, Solution 8 | 2 | $400 |
| 14 | AND | Node 10, Node 12 | 5 | $1440 |
| 15 | AND | Node 11, Node 12 | 2 | $1510 |
| 16 | AND | Node 11, Node 13 | 4 | $1510 |
| 17 | OR | Node 14, Node 15 | 7 | $1440 |
| 18 | OR | Node 16 | 4 | $1510 |
| 19 | OR | Solution 6 | 1 | $400 |
| 20 | OR | Solution 7, Solution 8 | 2 | $400 |
| 21 | AND | Node 17, Node 19 | 7 | $1840 |
| 22 | AND | Node 18, Node 20 | 8 | $1910 |
| 23 | OR | Node 21, Node 22 | 15 | $1840 |

Thus, the graph represents 15 joint solutions and the cheapest joint solution is $1840. The techniques disclosed in de Marcken (U.S. Pat. No. 6,257,808) can be used to extract the cheapest joint solution, enumerate the joint solutions, compute the lowest total price given that a particular passenger chooses a particular individual solution, and so forth.

Conventional techniques for structuring graphical model computations to improve efficiency can be adapted for the purposes of improving the efficiency of the process of combining individual solutions to produce a factored representation of joint solutions. In this way, conventional algorithms such as the "junction tree algorithm" can be adapted to improve the efficiency of Algorithm A. In particular, the manner in which passenger groups are processed to produce combined indices can be structured as a tree with the topology determined by the nature of the joint travel requirements, so that the size of combined indices is minimized.

Since, the only information that is necessary to construct joint solutions from individual solutions is contained within the index of the individual solution, it is beneficial for a TPS to return individual solutions with as many different individual indices as possible, rather than returning multiple solutions with the same individual index. This maximizes the effective "coverage" of the individual query, increasing the chance of producing at least one individual solution that meets joint travel requirements.

Some TPSes offer control over the selection of solutions and in such a case, the controls can be to maximize individual index diversity. An example of such a TPS is described in U.S. patent application Ser. No. 09/431,365 filed, November "METHOD FOR GENERATING A DIVERSE SET OF TRAVEL OPTIONS" de Marcken (pending) incorporated herein by reference. In the de Marcken application, the TPS chooses the best solutions that meet each of a set of diversity criteria. Such a TPS is particularly desirable for the purposes of this algorithm, and if the TPS offers querier control over the diversity criteria used, the querier should choose the diversity criteria to match the components of the passenger group's individual index.

An alternative method that may increase the chance of individual queries producing individual solutions that will match up well with the individual solutions of other individual queries is to impose similar biases across all queries. Returning to the 3-passenger-group example that introduces solution indices (above), if there are many possible flight combinations from LAX to NYC and SAN to NYC, then the individual queries for passenger groups 1 and 2 may not produce many solutions with the same final flight into NYC, especially since there are several possible NYC airports.

However, the probability of individual solutions sharing the same final flight increases if the individual queries for passenger groups 1 and 2 both favor the same kinds of flights such as morning flights. If a TPS permits querier control over the preference function used to select solutions, then the querier can request the TPS to favor individual solutions with particular properties, increasing the chance of similar solutions being produced across all the different individual queries. As an example, each query can request that price ties be broken to favor the JFK airport, and after that the arrival that is closest to noon.

One potential problem with constructing joint solutions from individual solutions produced by traditional TPS queries is that because of seat capacity limitations it may not be possible to purchase the joint solutions. This happens when each individual solution depends on purchasing the last seat of a flight.

One way to avoid this possibility is to artificially increase the passenger counts for individual queries. For example, if the second passenger group might use the same flights for some portion of the trip as the first passenger group, then the second passenger group's passenger counts are increased to include those passengers from the first passenger group. Therefore, the second passenger group's query will not produce answers unless there are enough seats available for both the first passenger group and the second. Similarly, the third passenger group's counts are increased by the sum of the first two groups (if there is any possibility of flight overlap). If such a technique is used, the prices for the individual solutions are adjusted to subtract out the cost of the inflated passenger counts.

Alternatively, the TPS may be adapted so that the querier can provide seat availability counts to be subtracted from flights during the course of the TPSes normal execution. In this manner, the TPS directly accounts for other passenger groups, without having to artificially modify the counts of the passenger group being submitted.

It may be that even with the use of these techniques, no joint solutions are found. This would most likely occur in two circumstances:

1. Too many joint travel requirements are imposed, or joint travel requirements are too detailed, such that the chance of individual solutions with matching indices being produced by independently posed queries is small.

This is likely to happen if same-flight requirements are imposed, especially if for more than one trip segment.

2. Joint travel requirements can only be met if one passenger group uses individual solutions that are substantially worse than other individual solutions, ignoring joint travel requirements and preferences. This might happen in the following situation.

---

PG 1: 1. SEA -> SFO, May 1
PG 2: 1. LAX -> SFO, May 1

Because the two origins are so far geographically separated, it is unlikely that any flight combinations produced in isolation for either origin will have the same final flight.

Figure 8:
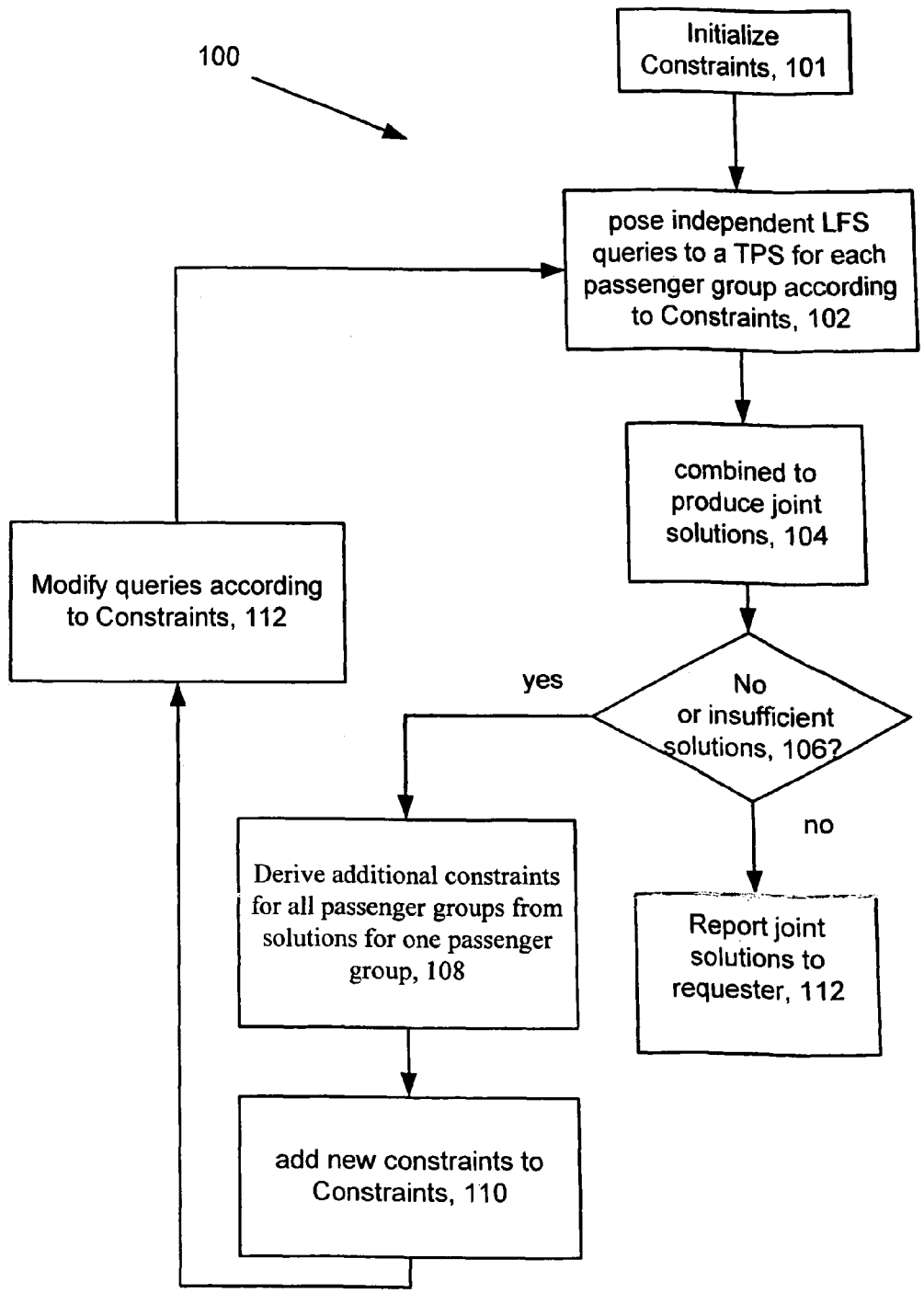

A technique for finding joint solutions in these cases is to constrain one or more individual queries in such a way to increase the likelihood of producing individual solutions that satisfy the joint query. A technique for constraining 100 in this way is as follows:

Referring now To FIG. 8, a technique 100 to constrain individual queries is shown. The technique initializes 101 a list of constraints "Constraints." The technique poses 102 individual queries to the TPS 12 according to the constraints and combines 104 the results received from the TPS 12 to produce joint solutions, for example using algorithm A. At an initial posing of the queries the Constraints is initialized t a null, e.g., having no constraints. The process tests 106 the number of joint solutions produced. If sufficient numbers are produced, the process reports 112 the joint solutions. If no joint solutions or insufficient number of joint solutions are produced, the process 100 examines 108 the joint travel requirements to find the smallest subset that cannot be satisfied. The examining involves choosing the passenger group whose individual solutions exhibit the least diversity with respect to the subset of joint travel requirements (i.e., that have the fewest number of "sub-indices" for the subset of unsatisfiable joint travel requirements). For that passenger group, selecting one or more of the passenger group's sub-indices and calculating for every other passenger group the set of possible indices compatible with them (irrespective of whether those indices were generated). The process adds 110 new constraints to the list Constraints and modifies 112 the individual queries to constrain the queries with the constraints, e.g., to the indices calculated, as above. The process restarts by posing 102 the constrained individual queries to the TPS.

As an example, if it is not possible to produce joint solutions because there are no individual solutions for passenger groups 1 and 2 that share the same departure time (within 2 hours) for trip segment 1 and last flight into NYC for trip segment for passenger group 2 and passenger group 3, then passenger groups 1 and 2 are compared to find out which has the smallest number of combinations of departure time and last flight into NYC. Suppose it is passenger group 1. The process selects the index that has the cheapest individual solution for passenger group 1; suppose it is departure at 6 pm and last flight NW12, the process is restarted, constraining each individual query such that it is consistent with 6 pm/NW12 for passenger group 1. That is, the first passenger group query is constrained to those exact values, whereas passenger groups 2 and 3 are constrained to departure of trip segment 1 within two hours of 6 pm, and passenger group 2 is further constrained to have arrival flight for the 3rd trip segment of NW12.

A further technique for attempting to find joint solutions in the case where none are otherwise found addresses the same problem as biasing the solutions does: there may be so many possible individual solutions that the chance of the TPS returning individual solutions that match is small. The technique assumes that the TPS can return a set of individual solutions sufficiently large to exhibit variation on each individual dimension (e.g., each trip segment) but not sufficiently large to populate the total set of dimensions. For example, consider a two trip-segment case where two passengers seek similar outbound and returns flights, but there are 100 possible flight combinations outbound and 100 possible flight combination on the return, and the TPS can only return 500 solutions to an individual query. Since there are 10,000 possible total trips for each passenger, and the TPS is only returning 5% of them for each individual query, if answers are chosen mostly at random the expected number of exact matches across both passengers is small.

However, the individual solutions returned by a TPS may exhibit substantial variation in the flights of each trip segment. If the TPS can return 500 solutions, it may be able to return the cheapest solution for each outbound flight combination and also the cheapest solution for each return flight combination. (An example of such a TPS is described in U.S. patent application Ser. No. 09/431,365 filed, November "METHOD FOR GENERATING A DIVERSE SET OF TRAVEL OPTIONS" de Marcken (pending)).

Given sets of individual solutions with substantial single-dimension variation, the MPMR TPS can rate aspects of the trip (such as outbound flight combinations) using the sum of the values of the best individual solution matching that aspect, summed over all passenger groups. Thus, outbound flight combinations receive a joint rating and return flight combinations receive a joint rating.

It may be that the TPS does not produce individual solutions sufficient for constructing a joint solution from the best-rated outbound and best-rated return flight combinations. That may only be because of chance, not because such solutions would not be valid. Therefore, the TPS can be re-queried biasing each individual query to favor the best-joint-rated aspects, greatly increasing the chance that solutions will be combinable.

As another example, suppose two passengers, one an adult and one a senior, wish to travel round-trip from BOS to LAX together, but they are willing to save money by traveling on separate flights (they have a same-flight preference, but not requirement). Suppose all outbound and return flight combinations on the same carrier have identical prices, the senior gets a small discount, and because of idiosyncrasies in the TPS, slightly different choices of individual solutions than the adult. The response to each individual query is as follows:

|  | BOS->LAX | LAX->BOS | Price |
|---|---|---|---|
|  | Psgr 1 solutions: | | |
| 1: | DL 100 | DL 500 | $300 |
| 2: | DL 102 | DL 502 | $300 |
| 3: | UA 300 | UA 700 | $310 |
| 4: | DL 101 | DL 501 | $300 |
| 5: | UA 301 | UA 701 | $310 |
| 6: | UA 302 | UA 702 | $310 |
|  | Psgr 2 solutions: | | |
| 1: | DL 102 | DL 505 | $270 |
| 2: | UA 300 | UA 701 | $271 |
| 3: | UA 302 | UA 700 | $271 |
| 4: | UA 301 | UA 702 | $271 |
| 5: | DL 100 | DL 501 | $270 |
| 6: | DL 101 | DL 502 | $270 |

In this example, there are no solutions with common flights outbound and return. However, the MPMR TPS can compute a joint rating for each trip-segment option, and use the rating to rank outbound and return possibilities:

|  | Psgr 1 | Psgr 2 | Joint |
|---|---|---|---|
| BOS->LAX | | | |
| DL 100 | $300 | $270 | $570 |
| DL 101 | $300 | $270 | $570 |
| DL 102 | $300 | $270 | $570 |
| UA 300 | $310 | $271 | $581 |
| UA 301 | $310 | $271 | $581 |
| UA 302 | $310 | $271 | $581 |
| LAX->BOS | | | |
| DL 500 | $300 | $270 | $570 |
| DL 501 | $300 | $270 | $570 |
| UA 700 | $310 | $271 | $581 |
| UA 701 | $310 | $271 | $581 |
| UA 702 | $310 | $271 | $581 |
| DL 502 | $300 | — | — |
| DL 505 | — | $270 | — |

Given the ranking, the TPS can be re-queried in a manner that biases responses to highly ranked possibilities. For example, the TPS could be limited to exploring the top options for each trip segment (such as limited to DL 100 and 101 outbound and DL 500 and DL 501 return). If this is done, the responses to the follow-up queries are much more likely to include common solutions:

|  | BOS->LAX | LAX->BOS | Price |
|---|---|---|---|
| Psgr 1 solutions: | | | |
| 1: | DL 100 | DL 500 | $300 |
| 2: | DL 100 | DL 501 | $300 |
| 3: | DL 102 | DL 500 | $300 |
| 4: | DL 102 | DL 501 | $300 |
| Psgr 2 solutions: | | | |
| 1: | DL 100 | DL 500 | $270 |
| 2: | DL 100 | DL 501 | $270 |
| 3: | DL 102 | DL 500 | $270 |
| 4: | DL 102 | DL 501 | $270 |

Figure 9:
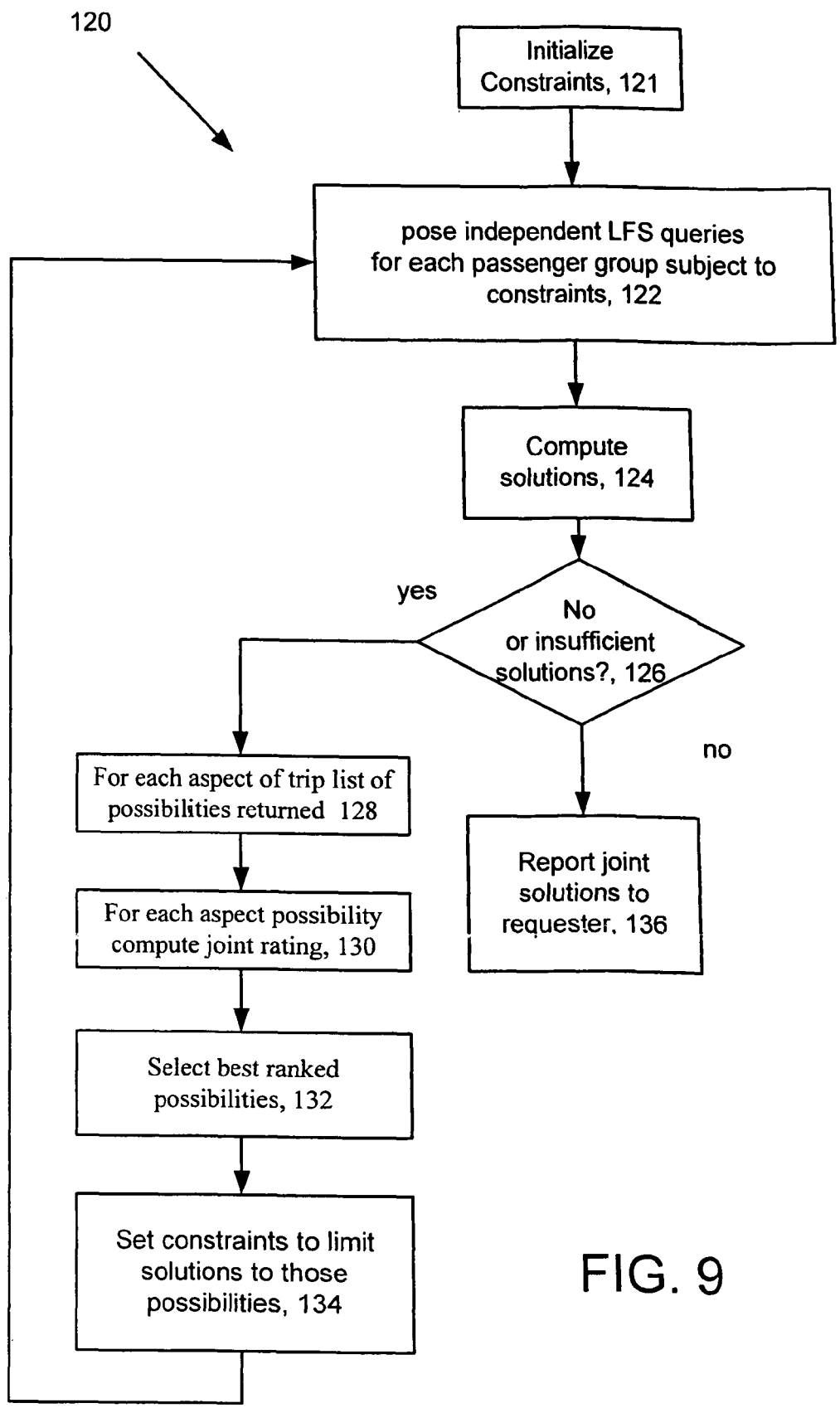

Referring to FIG. 9, an MPMR process 120 that uses ratings and rankings is shown. The process 120 initializes 121 a data structure Constraints={ }, and poses 122 individual queries subject to the Constraints. The queries can be posed concurrently. If the TPS supports diversity control, the TPS will request diversity on each aspect of trip relevant to joint travel requirements/conditions. The process will compute solutions 124, e.g., using the technique described above in FIGS. 7A, 7B. The process 120 determines 126 if sufficient number of joint solutions exist. If a sufficient number exist, the process returns 136 the solutions and quits. Otherwise, 128 for each aspect of the trip relevant to joint travel requirements/conditions, the process makes a list of possibilities, e.g., possible itineraries returned in any individual solution (for this example, a list of outbound itineraries and a list of return itineraries). For each aspect possibility, the process computes 130 a rating by summing over passengers of best individual solution value for any solution involving the aspect possibility. For each aspect, the process selects 132 a small number of the best-ranked possibilities and sets 134 the Constraints to limit the solutions to those possibilities and returns to pose the individual queries and repeat the process.

In some cases, it may be that possibilities for certain aspects appear in the solutions for some but not all passenger groups, as per the DL 502 and DL 505 flights in the example above. If the possibilities are highly ranked for the passenger groups they appear in, it may be possible to alter the constraints in such a way to cause the possibilities to be generated for all passenger groups in the next iteration.

The techniques disclosed above pose several individual queries independently, that is, without taking into consideration any dependency between the individual queries. One advantage to such techniques is that the individual queries (IQs) can be posed concurrently, reducing the latency of responses. However, there are several disadvantages to independent searches, such as the difficulty in ensuring that the solutions produced by each align with each other with respect to joint requirements and preferences.

One simpler solution to this problem is to pose individual queries (IQs) consecutively, using the results from one query to constrain the next query. This can be done either with or without interactive input from the user in between queries.

Figure 10:
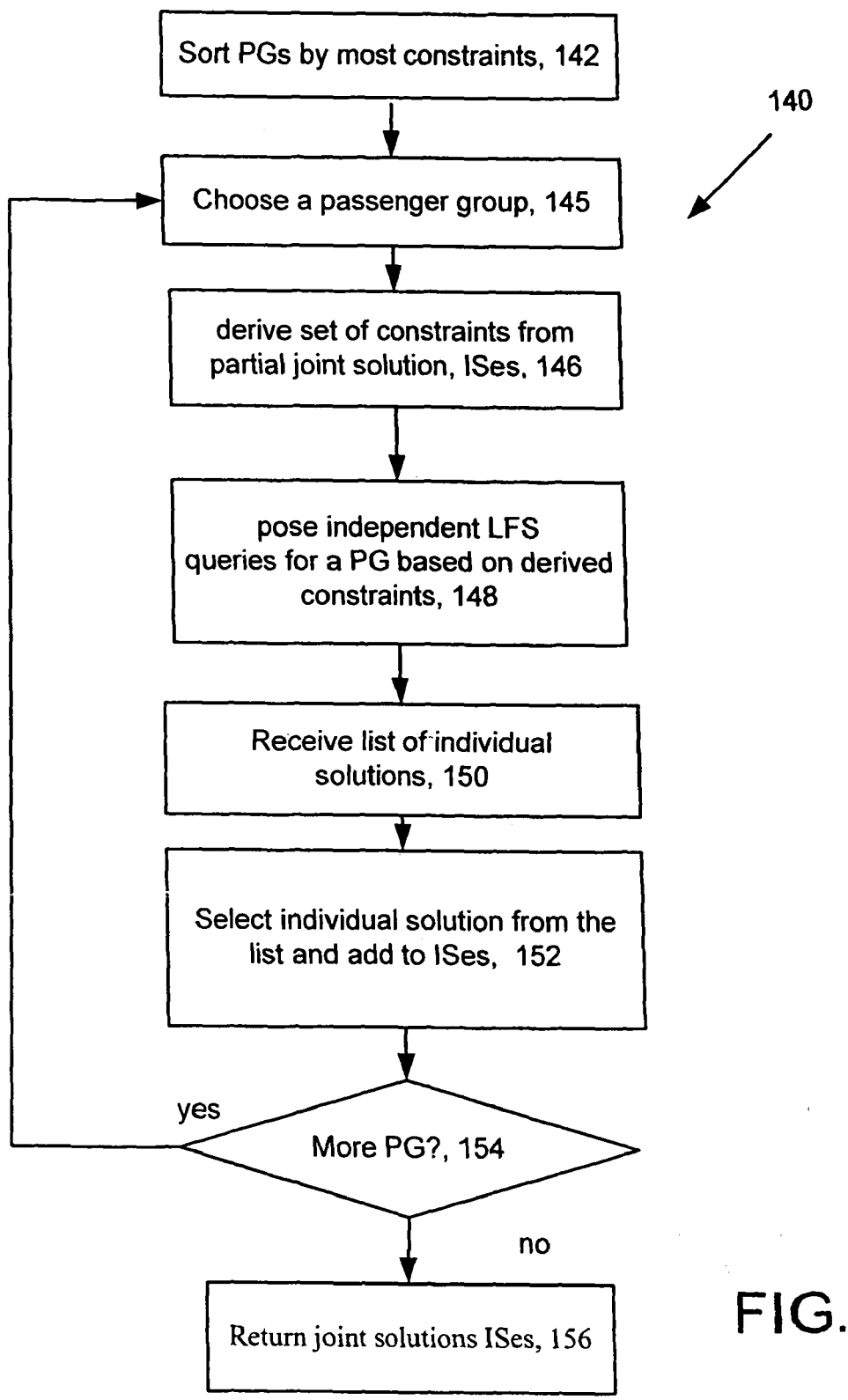

Referring to FIG. 10, an incremental searching technique 140 is shown (Algorithm B). The incremental searching process 140 optionally can sort 142 passenger groups in such a way that those with the most constrained trips appear earlier. The incremental searching process 140 produces 144 tables (ISes) of individual solutions, one per passenger group. The process 140 chooses 145 a group, e.g., the first unprocessed passenger group. From the chosen passenger group the process derives 146 from the ISes and joint travel requirements a set of constraints "C" on the individual query "IQ" for the chosen passenger group. The process poses 148 to the TPS an individual query for that passenger group, with the query being modified with the derived constraints. The process 140 receives 150 a set of solutions returned from the TPS 12. The TPS returns the set of solutions in a list, e.g., Solutions. The process filters from the list Solutions those solutions that are incompatible with ISes. This is necessary only if the set of constraints C does not reflect all of the constraints imposed by ISes. The process chooses 152 an individual solution from the list Solutions, either manually or automatically and adds the selected individual solution to the list ISes and tests 154 to see if the process 140 has completed processing of all groups. If complete, the process returns 156 the lists ISes, otherwise the process chooses 145 the next unprocessed passenger group.

Sorting the passenger groups so that the most constrained appear first, is not necessary but can result in substantially simpler individual queries. As an example of how to sort the passenger groups, those passenger groups with the fewest number of trip segments, or shortest departure or arrival time ranges, or most joint requirements, can be sorted first.

From the set of individual solutions for a subset of PGs, constraints are derived that are added to the individual queries that are sent for subsequent passenger groups.

Suppose for example that after processing passenger groups 1 and 2,

---

ISes = { { PG1: Dec 14 SFO->LGA 1 pm UA100, Dec 20 LGA->SFO 5 pm UA200 }, { PG2: Dec 18 PWM->JFK 5 pm US300, Dec 20 JFK->SFO 2 pm US220 } }

--- there are two joint travel requirements between passenger group PG 3 and prior passenger groups PGs 1 and 2:

PG3: travel from SFO to NYC on December 14, on same flights as PG 1 travel from NYC to SFO on December 20, leaving same airport as PG2 at approximately the same time Examining the individual solutions for passenger groups PGs 1 and 2 already in ISes, one constraint derived from the joint travel requirements is that passenger group PG3 travels from SFO to LGA on flight UA100, and on December 20th departs JFK at approximately 2 pm. These constraints can be added to the original IQ for PG 3, ensuring that only individual solutions compatible with PGs 1 & 2 trips are returned. If it is not possible to express a derived constraint in a form that the TPS can accept, it may be ignored and incompatible solutions filtered, though this is not desirable.

A single solution from those compatible with previous ISes is chosen. It may be chosen automatically, such as by choosing the cheapest or most convenient solution, or the set of solutions may be presented to the querier for one to be manually selected. If no solutions remain, so that none can be selected, one option is to backtrack and choose a different solution for an earlier IQ. Another is to backtrack and re-order passenger groups PGs.

More powerful forms of incremental search are possible. The incremental searching technique 140 (FIG. 10) keeps tally of only one partial joint solution, a very narrow form of search.

Process 80 can be modified so that multiple partial combined solutions are accumulated, so that the table of individual solutions ISes is replaced with a set of tables, each representing a different partial joint solution.

Figure 11A:
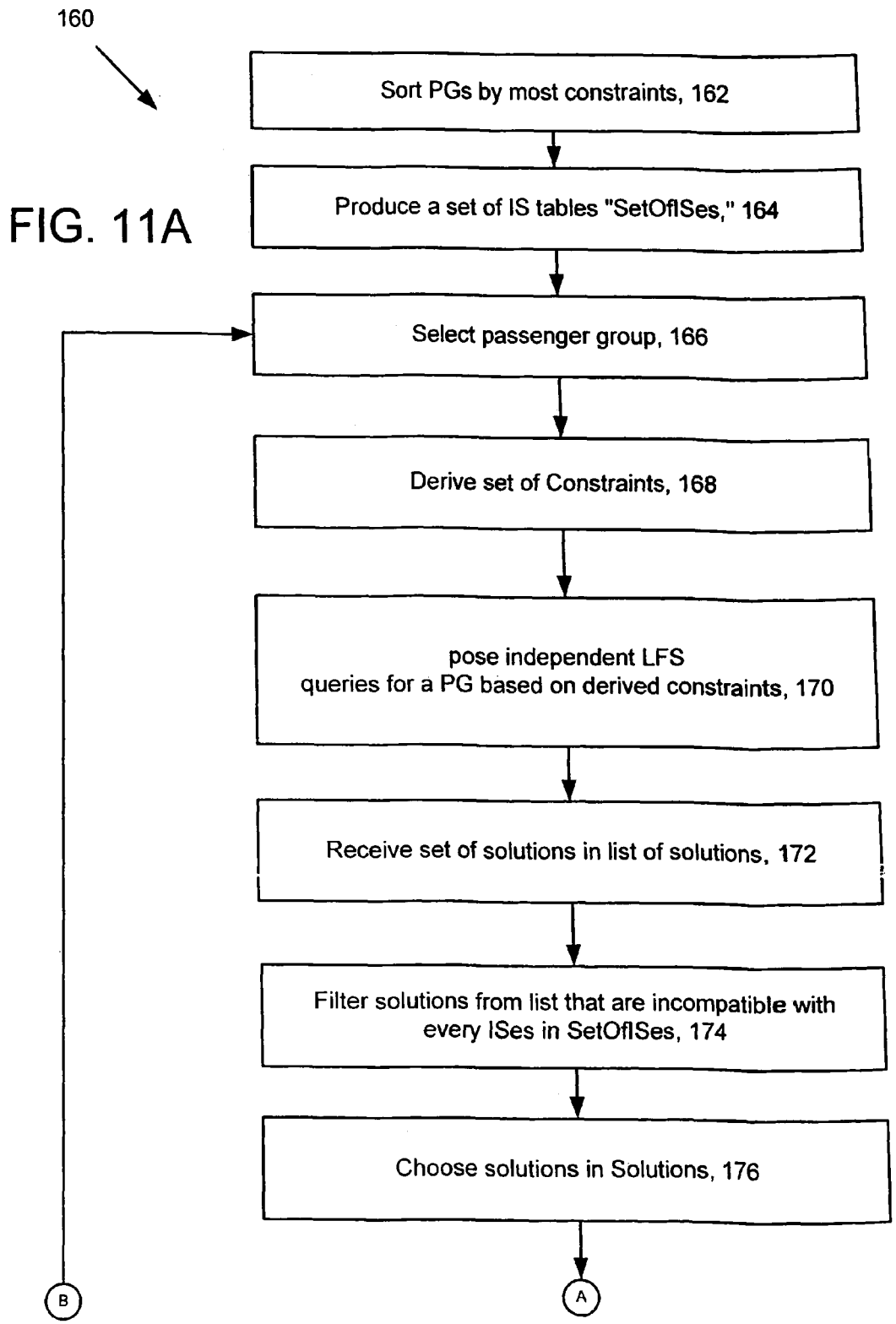
Figure 11B:
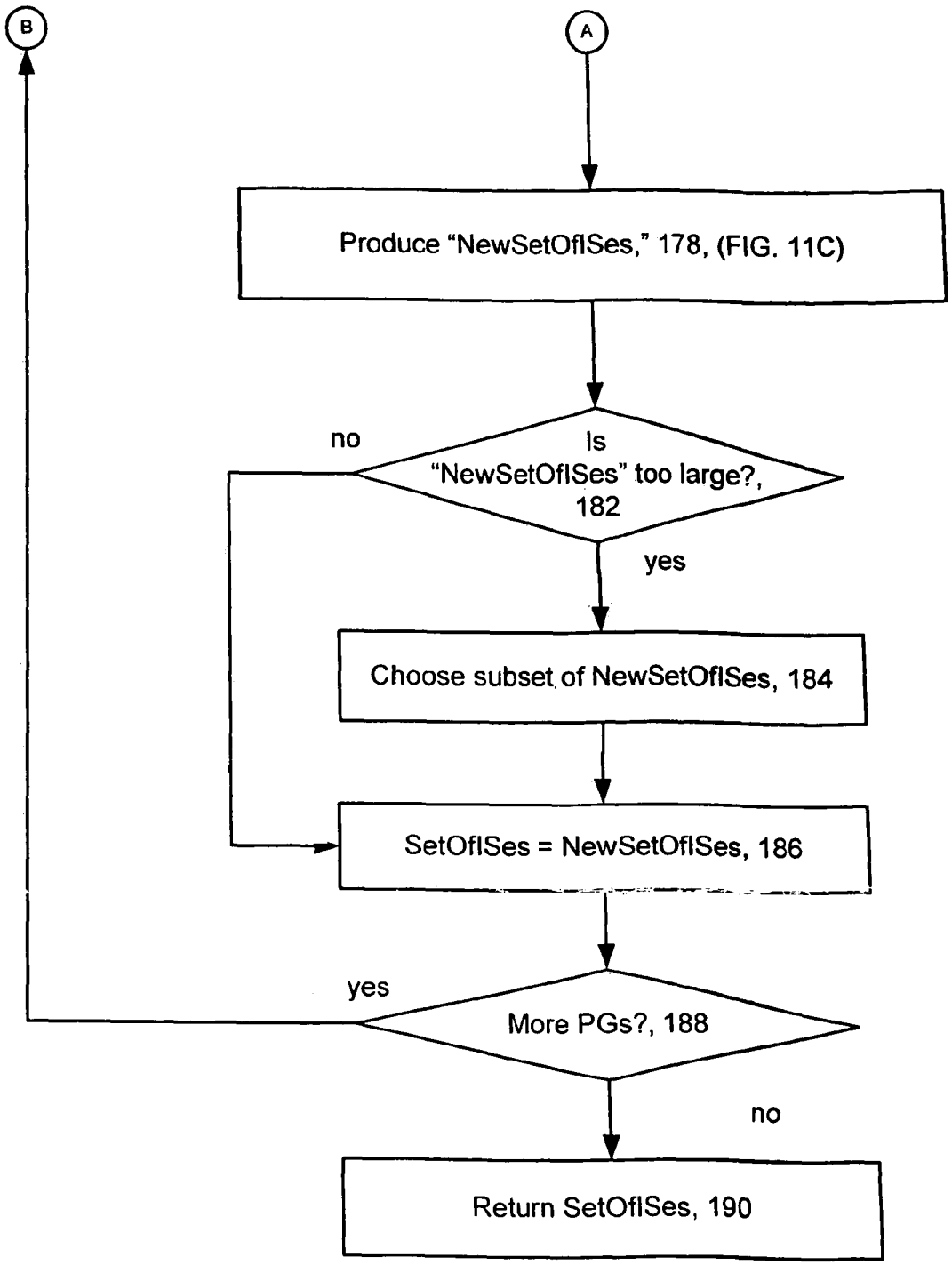

Referring to FIGS. 11A-11B, an alternative incremental searching technique 160 is shown. The alternative incremental searching technique 160 sorts 162 passenger groups in such a way that those with the most constrained trips appear earlier, as discussed above. The alternative incremental searching technique 160 provides a set of IS tables "SetOfISes." The alternative incremental searching 60 technique chooses 166 an unprocessed passenger group and derives 168 from SetOfISes and the joint travel requirements a set of constraints C on the individual queries for PG that passenger group. The alternative incremental searching technique poses 170 to the travel planning system individual queries (IQ) for that passenger group (PG) with the individual queries IQ modified with the constraints C. The alternative incremental searching technique 160 receives 172 a set of solutions "Solutions" from the TPS 12. The solutions are filtered 174 from "Solutions" set to remove any incompatible solutions that are incompatible with every ISes within SetOfISes. The filtering 174 is necessary only if the set of constraints C does not reflect all of the constraints imposed by SetOfISes. The alternative incremental searching technique 160 chooses 176 some number of individual solutions in Solutions(i), either manually, e.g., using input from the user, or automatically. This set of individual solutions is labeled "selectedISes." The process 160 produces 178 a new set of individual solutions "newSetOfISes," that is initially empty.

Figure 11C:
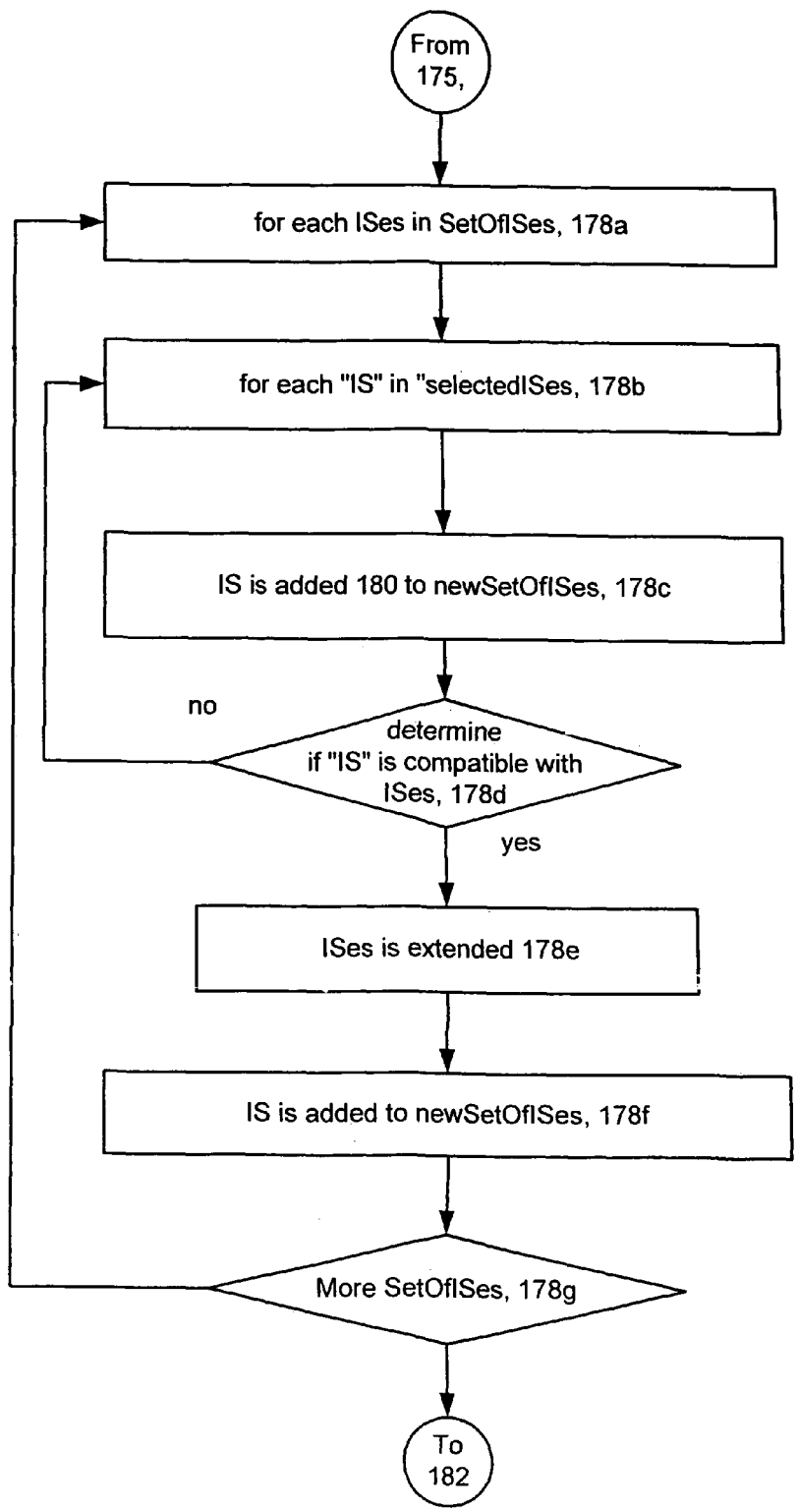

Details of producing 178 a new set of individual solutions is shown in FIG. 11C. For each ISes in SetOfISes 178a and for each "IS" in "selectedISes," 178b, the producing 178 determines 178c if "IS" is compatible with ISes with respect to joint travel requirements. If not compatible the "IS" is not included, and the next "IS" in "selectedISes," is processed (178b). If compatible, ISes is extended 178d with IS and added 178e to newSetOfISes. If there are more ISes in SetOfISes producing 178 returns to (178a).

Otherwise, returning to FIG. 11B, the process 160 determines if newSetOfISes is too large 182. If it is too large, the process chooses 184 subset of best partial joint solutions, either automatically (such as the cheapest ISes, as measured by the summed cost over all IS in ISes, or manually (letting the user choose). The SetOfISes is made equal to newSetOfISes 186 and the process tests if there are more passenger groups 188 and returns the SetOfISes if done. Otherwise, if the newSetOfISes is not too large, the process 160 fetches 166 the next unprocessed passenger group.

In this process 160, the process of deriving constraints is slightly more complex because it is necessary to produce a set of constraints that allows the TPS to produce an IS if it is compatible with any prior ISes. One way this can be done is to derive a set of constraints 168 in the incremental searching technique 140 that produces a set of constraints for each ISes in SetOfISes, and to choose only constraints that appear in each set. If the TPS can accept multiple values for a constraint, such as multiple possible origin airports or multiple possible flight sequences, then queries can include values that appear in any constraint set (for example, if one ISes results in an origin airport requirement of LGA, and another an origin airport requirement of JFK, then the resulting constraint set is the restriction that the origin airport be either LGA or JFK).

The incremental process described above represents the set of partial joint solutions explicitly, rather than in a factored form as process 80 (FIG. 7) Algorithm A. The techniques disclosed above can be used so that the SetOfISes is represented in a factored form as set out in the pseudo code below:

Pseudo code for Factor Representation of SetOfISes

```
define compute-AND/OR-graph
    input: passenger groups G(1) ... G(n)
        individual travel queries IQ(1) ... IQ(n)
        joint travel requirements JTR
        joint travel preferences JTP
```

The pseudo code below describes more specifics details of the incremental searching technique 160. The incremental searching technique sorts 162 the passenger groups in such a way that those with the most constrained trips appear earlier

```
for each i from 1 to n
    IndexTemplates(i) = ComputeIndividualSolutionIndexTemplate(JTR,
        JTP, i)
    let Indices(i) be set of all individual solution indices for G(i),
        each entry initialized to { }
    let Solutions(i)(I) be set of all individual solutions for G(i) with index I,
        each entry initialized to { }
    let ORNode(i)(I) be table of OR graph nodes representing choice over all
        solutions in Solutions(i)(I)
// Working from passenger group 1 to n, calculate combined indices for
// passenger groups 1 ... i by combining those indices for passenger group i
// with the combined indices from steps 1 ... i–1; each combined index for
// 1 ... i is represented by its own AND/OR graph node
let CombinedIndices(i) be set of "combined indices" for G(1) ... G(i),
    where combined index CI = <I(1), ..., I(i)> represents conjunction
    of individual indices, each entry initialized to { }
let Graph(i)(CI) be table of graph nodes indexed by the combined index CI
Solutions(1) = pose individual query IQ(1) for passenger group G(1) to
TPS for each solution S in Solutions(1)
    let I = IndividualSolutionIndex(S, IndexTemplates(1))
    Solutions(1)(I) += S
    Indices(1) = union(Indices(1), { I })
for each index I in Indices(1)
    let S = Solutions(1)(I)
    ORNode(1)(I) = ConstructORGraphNode(S_1, S_2, ...)
    CI = <I>
    CombinedIndices(1) += CI
    Graph(1)(CI) = ORNode(1)(I)
(Optionally, let user choose subset of most promising
CombinedIndices(1), or automatically choose subset)
for each i from 2 to n
    let ANDNodes(CI) be list of AND nodes for the combined index CI,
        each entry initialized to { }
```

Incremental searching technique 160 derives 168 from CombinedIndices(i−1) a set of constraints Constraints(i) on IQ(i) for passenger group G(i)

```
Solutions(i) = pose individual query IQ(i) for passenger group G(i) to TPS,
              constrained by Constraints(i)
for each solution S in Solutions(i)
    let I = IndividualSolutionIndex(S, IndexTemplates(i))
    Solutions(i)(I) += S
    Indices(i) = union(Indices(i), { I })
for each index I in Indices(i)
    let S = Solutions(i)(I)
    ORNode(i)(I) = ConstructORGraphNode(S_1, S_2, ...)
    for each PreviousCI in CombinedIndices(i−1)
        GN = Graph(i−1)(PreviousCI)
        if CompatibleWithJointTravelRequirements(PreviousCI, I, JTR)
        let PV = CollectJointPreferenceViolations(PreviousCI, I, JTP)
        let CI = CombineIndices(PreviousCI, I)
        CombinedIndices(i) = union(CombinedIndices(i), { CI })
        ANDNodes(CI) += ConstructANDNode(GN, ORNode(i)(I), PV)
(Optionally, let user choose subset of most promissing
CombinedIndices(i), or automatically choose subset)
for each CI in CombinedIndices(i)
    let A = ANDNodes(CI)
    Graph(i)(CI) = ConstructORNode(A_1, A_2, ...)
// Construct the final graph by combining the nodes for all combined
indices
let G = { }
for each CI in CombinedIndices(n)
    G += Graph(n)(CI)
return ConstructORNode(G(1), G(2), ...)
```

In this algorithm, choosing the most promising CombinedIndices can be performed in various ways. An automated procedure can choose those with the minimum cost summed over all individual solutions encompassed by each combined index. A manual process can present to the user the list of the combined indices, displaying the information contained in the index in a form that enables the user to choose joint travel properties that seem most desirable, and request the user to select a small subset of the combined indices for continued processing.

Solving with Pricing-Graph

Many traditional TPSes are limited in ability to return a sufficiently large number answers to individual travel queries, which poses challenges for MPMR travel planning. If a TPS can represent many more solutions internally than it can practically list in a response, as the TPS described in de Marcken & Wertheimer (U.S. Pat. No. 6,295,521), which can represent very large numbers of solutions in pricing-graph form (de Marcken, U.S. Pat. No. 6,275,808), then it is desirable to solve MPMR queries "within" the TPS so that all individual solutions for all passengers are available simultaneously.

The TPS described in de Marcken & Wertheimer (U.S. Pat. No. 6,295,521) can be modified so that for an individual query, the TPS produces separate pricing-graphs for each solution index (using the terminology of process 80 FIG. 7)). Thus, for every index that summarizes the aspects of individual solutions relevant to joint travel requirements and preferences, the TPS generates factored representations of very large numbers of individual solutions with those aspects. Such a pricing-graph representation of individual solutions can be plugged directly into process 80, taking the place of the OR G(i) (I) nodes. In this way an AND/OR pricing graph is constructed that is similar in form to that of a single-passenger pricing-graph (e.g., it has flights and fares as terminals) but the pricing graph also encodes joint solutions. The algorithms of de Marcken (U.S. Pat. No. 6,275,808) can then be run on the pricing grapy to enumerate joint solutions.

A distinction in the form of the pricing-graph is that the new pricing-graph (as proposed here) also includes joint preference violation information.

Modifications of the TPS described in de Marcken & Wertheimer (U.S. Pat. No. 6,295,521) to generate multiple pricing-graphs can implemented in the "linking" sub-routine described in U.S. Pat. No. 6,295,521 columns 36-44. Itineraries are annotated with the information used in algorithm A for computing individual solution indices, and this information is further collected and maintained within the slice-label-set and open-label-set data structures. In particular, itineraries with different index information are placed in different slice-label-sets, and this separation is maintained in the open-label-sets. In this way, at the completion of the linking process multiple complete open-label-sets are produced, each representing sets of solutions with different individual indices. The pricing-graph data structure is constructed once per complete open-label-set.

Figure 12:
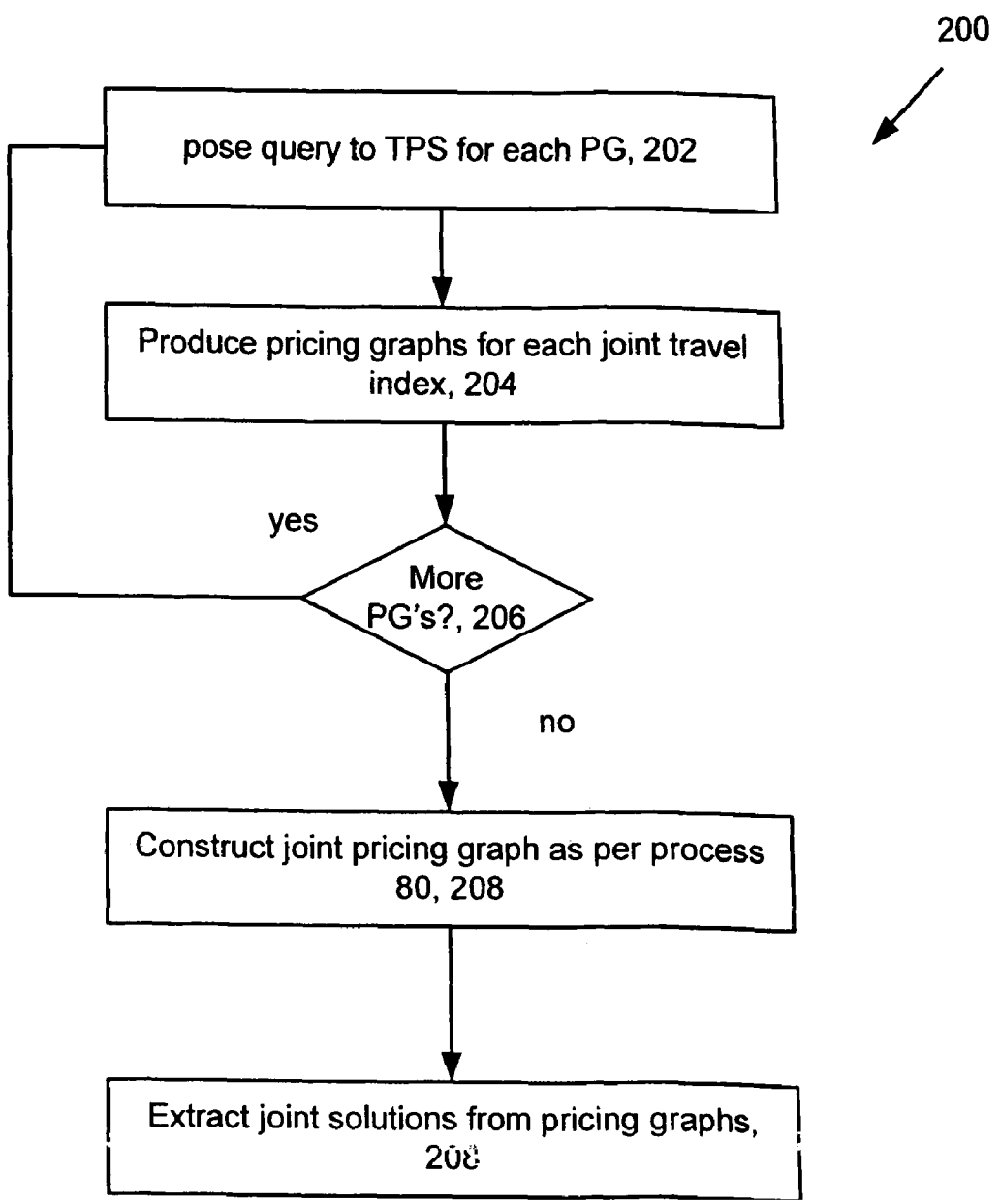

Referring to FIG. 12, a process 200 to allow a TPS responding to an individual query to produce separate pricing-graphs is shown. The separate pricing graphs are for each solution index and summarizes aspects of individual solutions relevant to joint travel requirements and preferences. The process 200 poses 202 a query to a TPS to perform a travel search. For each passenger group, the TPS produces 204 pricing-graphs for each joint travel index in response results obtained from the query. These searches can be run concurrently, if supported by the TPS. The modified version of process 80 is used to produce joint solution pricing-graphs. The process tests 206 to see if there are any more PS's. If there are more, the process 200 continues otherwise the process extracts 208 or otherwise manipulates the joint solutions of the pricing-graph using ordinary pricing-graph enumeration algorithms, as discussed.

Biasing Scheduler to Ensure Overlap

Some TPSes solve LFS queries in a manner that is commonly called "itinerary-led" searching. In itinerary led searching, the TPS first uses a flight scheduler program to generate flight combinations (itineraries) for each trip segment, and prices combinations of itineraries that form whole trips (either incrementally, by enumerating sets of itineraries that form whole trips and pricing each, or by pricing all possible sets simultaneously (as per de Marcken & Wertheimer, U.S. Pat. No. 6,295,521). Computational and design limitations typically limit the number of itineraries an itinerary-led TPS can practically consider to a small proportion of all possible itineraries, and typically those that are examined are the shortest duration or most convenient itineraries.

However, MPMR queries with same-flight requirements or preferences can be problematic for itinerary-led TPSes if providing solutions in which the same flights would require one passenger to choose a substantially less convenient itinerary, because it is unlikely the TPSes flight scheduler would naturally produce such an itinerary.

As an example, consider the following 2-passenger MPMR query:

Psgr 1: MIA->LON, Aug 5
Psgr 2: SFO->LON, Aug 5
Desire same transatlantic flight Desire Same transatlantic Flight Solving this problem is difficult using methods that pose individual queries for each passenger, because a TPS that generates only a moderate number of itineraries for each individual query is unlikely to generate many itineraries with common transatlantic flights (the MIA-LON query is likely to concentrate itineraries on transatlantic flights departing MIA, and the SFO-LON flight is likely to concentrate itineraries on transatlantic flights departing SFO, CHI, DEN, NYC and BOS.

Figure 13:
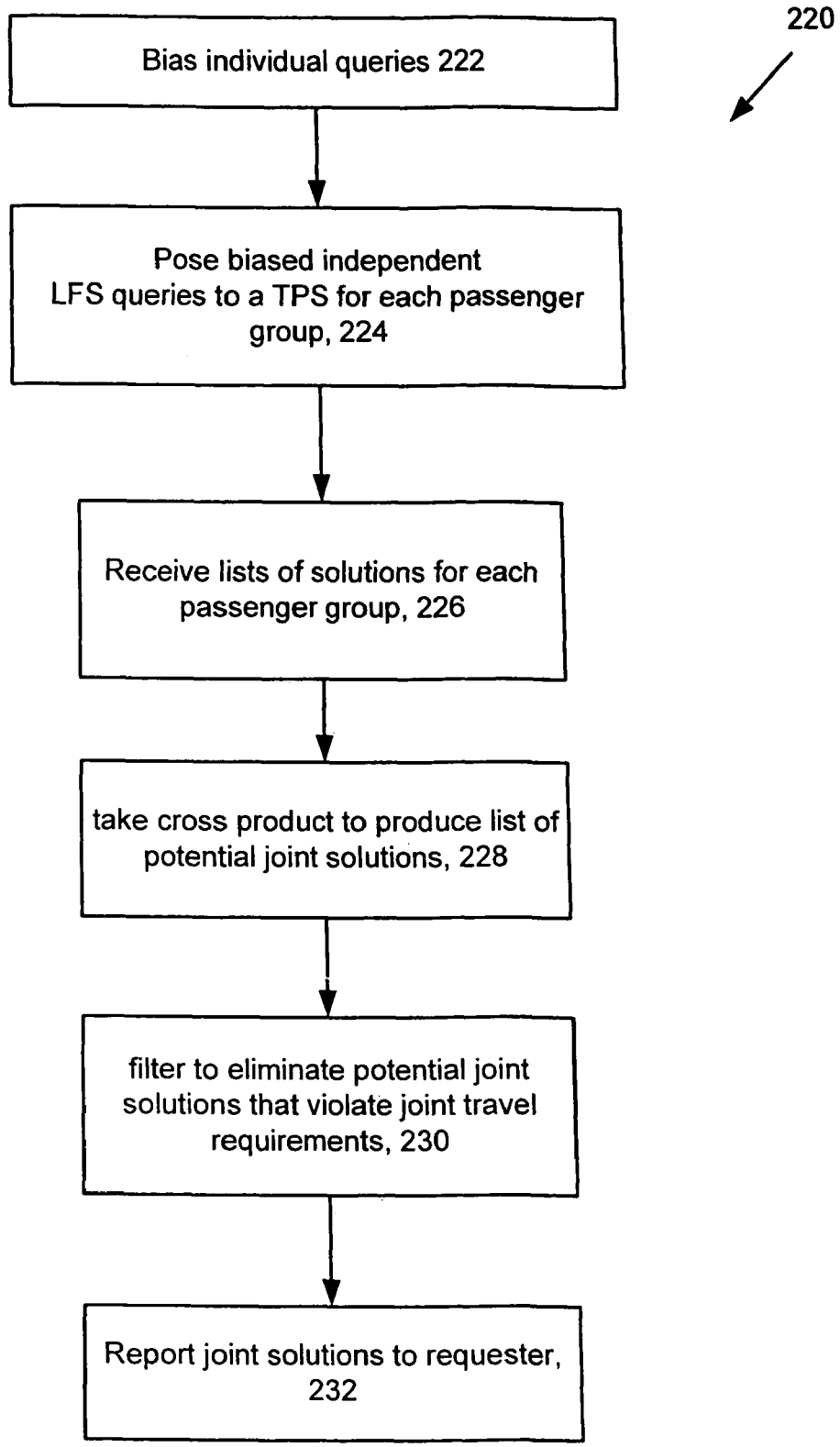

Referring to FIG. 13, one approach for handling MPMR queries with same-flight requirements or preferences is to bias 222 the flight scheduler behavior in each individual query in a manner that increases the likelihood of generating itineraries that will meet joint travel requirements. As mentioned above, increasing the diversity of responses to IQs generally increases the likelihood of meeting joint travel requirements; biasing the flight scheduler programs is another technique to increase the likelihood of meeting the joint travel requirements.

The process 220 sends 224 independent LFS queries to a TPS for each passenger group. Each query produces a list of individual solutions appropriate for the passenger group. The process 220 receives 226 the lists from, e.g., the TPS. The lists of individual solutions are combined 228 to produce joint solutions. Combining of the joint solutions includes taking 230 a cross product of the lists of individual solutions to produce a list of potential joint solutions and filtering the list of potential joint solutions to eliminate potential joint solutions that violate joint travel requirements. The joint solutions are reported 232 to the client 11.

A wide variety of techniques can be used to bias the flight scheduler to improve the probability that individual solutions meet joint travel requirements. A large number of itineraries can be generated and culled to a number practical for pricing using diversity-enhancement techniques can be applied to itineraries, such as those diversity-enhancement techniques described U.S. patent application Ser. No. 09/431,365 filed, November "METHOD FOR GENERATING A DIVERSE SET OF TRAVEL OPTIONS" de Marcken (pending). Of particular interest is ensuring route diversity. In situations where joint travel requirements or preferences are only met when multiple passenger groups with different trip segment origins or destinations share flights for some portion of a trip segment, it is advantageous for the flight scheduler for an individual query to route itineraries through the origins and destinations of other individual query.

For example, in the case of the MIA→LON/SFO→LON example, for each individual query the TPS enhances the set of flight schedules by generating some itineraries with intermediate points dictated by the other individual query. Thus, in addition to the most practical routes from MIA→LON, the TPS also generates some number of MIA→SFO itineraries that go through SFO. Likewise, for the SFO→LON query, additional itineraries are generated with MIA as an intermediate point.

User interfaces for presentation and selection Special challenges arise in the presentation of results from MPMR queries. First, the number of possible solutions can be substantially larger than those of single passenger-group queries, so interfaces based on explicitly listing options may be less practical. Second, as multiple parties may be involved in evaluating solutions it is desirable for the decision process to be decoupled as much as possible.

User interfaces for non-MPMR travel can be adapted for MPMR travel. For example, a user interface that displays a list of (single-passenger-group) solutions can instead display a list of joint solutions by treating each joint solution as a lengthier single passenger-group solution. However, in such a display it may be desirable to highlight particular features of the joint solution, such as the total cost and the cost per individual solution, or the total number of hours spent traveling and the number of hours per individual solution. However, given the complexity of joint solutions, it may also be desirable to hide detailed information.

Referring to FIG. 14, an example presentation interface 250 displaying joint solutions in a tabular format, such as on a web page, with one row per joint solution is shown. Here a first set 252 of three cost/hrs/stops columns is devoted to the joint solution properties and other sets 254 and 256 pf columns are devoted to individual solution properties for each of the two passenger groups (e.g., Ann and Bob). In this example, the "<details>" entries are controls 257, e.g., a link, url, or other control that if activated would present a display of more detailed properties of the individual solutions, for example flights and times. Rows 258 of the presentation interface 250 correspond to solutions. In addition, a control (not shown) can be provided, e.g., by the "<details>" control, at the number column, or elsewhere, that allows the user to see more solutions that are similar to the particular solution associated with the "<details>" control selected or the number column selected.

Referring to FIG. 15, a second tabular presentation format 260, in which multiple rows are devoted to each joint solution for each trip segment that is part of any individual query, is shown. The interface 260 includes a first set of columns 262 that displays details for a first passenger group, e.g., the passenger group name and a second set of columns 264 that displays details for a second passenger group, e.g., the passenger group name. A third set of columns 266 are provided for displaying details of solution properties including a joint solution involving the first and second passenger groups. The multiple rows 268 correspond to a solution and are used to display details of the segments of the solution. Multiple solutions are represented by corresponding tabular presentations such as 260', as shown.

In FIG. 15, the trip segments are sorted by date, and in cases where identical flights are used for multiple passenger groups, those lines are collapsed 265' (in tabular presentation 260'). Notes 269 are provided that describe the satisfaction of joint travel requirements/preferences. Also, a control 263 is provided that allows the user to see more solutions that are similar to the particular solution shown in the interface.

Referring to FIG. 16, alternatively, it may be desirable to focus a display on a single passenger-group's trip, but provide basic information about the implications their choice has on the trips taken by the remaining groups. One way to do this is to produce a list of individual solutions for the passenger-group in question, and associated with each individual solution joint information such as the minimum price of any joint solution that includes the individual solution.

FIG. 16 shows presentation interface 270 including a column that depicts joint solution implications 272, columns 274 that depict details of the individual solutions, rows 278 that depict solutions and a control 273 that launches matching solutions in area 280.

In the case where the set of joint solutions is represented in a factored from such as an AND/OR graph, representing the joint solutions can be performed using the techniques discussed in de Marcken, U.S. Pat. No. 6,275,808.

In the de Marcken patent (U.S. Pat. No. 6,275,808) a colored bar representation is described that presents a technique for displaying and manipulating trips by trip-segment. This technique permits the display of itineraries for each trip segment, annotated with the minimum total rating for a complete trip involving the itinerary. The technique also permit itineraries for a given trip segment to be selected, with the display of the remaining trip segments updated accordingly. As the technique is based on AND/OR graphs, using any of the techniques described to produce an AND/OR graph with individual solutions as terminals (for example, process 80 FIG. 7), the same techniques can be used to display joint solutions in a manner where individual solutions for each passenger group are displayed separately but annotated with the minimum rating for a joint solution involving the individual solution, and to permit the selection of an IS to inform the display of other passenger-groups.

If an AND/OR graph is produced that represents individual solutions using an AND/OR graph (as per FIG. 12), the techniques of de Marcken can be used to simultaneously present each trip segment from each individual query and to allow the selection of any to inform the display of all others.

As with U.S. Pat. No. 6,275,808, filters can be implemented that filter joint solutions based on either joint or individual solutions.

Even if the set of joint solutions are represented as an explicit list, the displays described above can be implemented somewhat less efficiently by calculating properties of interest by explicitly iterating over each joint solution.

The techniques for displaying and manipulating joint solutions, as described previously, can be used for situations in which all parties of interest are viewing the data together. For some MPMR travel scenarios, in particular those where different passengers start trips from different origins, more distributed user interfaces may be desirable. For example, it may be desirable for multiple display programs run simultaneously in different locations, each display program displaying data focused on a different passenger-group. In such a case, it may be desirable for selections made by one passenger group to affect the displays of the other passenger groups (perhaps while each party is also communicating via telephone).

Alternatively, it may be desirable for a single passenger to pose the MPMR query and receive the results, but for that passenger to make the results available for viewing by other passengers. For example, a web site could be produced that displays joint solutions. Each passenger is able to visit the web site independently and view or manipulate joint solutions. A further alternative would allow each visitor to annotate joint solutions with comments, such as by marking desirable or undesirable individual or joint solutions. Such information would be viewable by subsequent passengers that visit the web site. In one embodiment, controls are available to enable filtering or sorting of joint solutions by rating functions that take into account comments by visitors (current or previous).

As previously described, it may be difficult to populate the space of joint solutions densely enough especially if joint solutions are produced by explicitly generating and filtering the cross-product of individual query solutions. It may not be possible to generate and display a joint solution set that includes the best possible joint solution for a set of passengers, even if similar joint solutions are produced.

For example, the technique of biasing each IQ to increase the likelihood of IQs matching may eliminate potential joint solutions that are equivalent, as far as the passengers are concerned, to a joint solution that is included in the result. For this reason, it may be desirable to offer in a user interface to request more joint solutions that are similar to a displayed joint solution, such as a "see more similar trips" control.

One way this can be implemented is to extract a set of properties from the joint solution and to re-pose the joint query enforcing the additional condition that new solutions have the same properties. For example, the origin and destination airports, airlines and travel dates of each trip segment of each individual solution can be included as constraints in a new joint query. In addition, if the source joint solution satisfies one or more joint travel preferences (for example, has two passengers traveling on exactly the same flights when this is desired), those preferences can be re-posed as requirements. Thus, for the joint solution to a query in which same-flights are desired but not required for the shared HNL→NYC portion of the trip, as depicted in Table II above, the following additional constraints may be derived and passed back in to the MPMR TPS to extract similar solutions:

| Psgr | Trip Segment | Constraints |
|---|---|---|
| Ann | NYC->HNL | Depart Mon, Sept 10; Depart JFK; Arrive HNL; <= 1 stop; on airline AA |
| Ann | HNL->NYC | Depart Sun, Sept 16; Depart HNL; Ariive JFK; <= 1 stop; on airline AA |
| Bob | NYC->LAX | Depart Wed, Sept 12; Depart LGA; Arrive LAX; <= 1 stop; on airline NW |
| Bob | LAX->HNL | Depart Fri, Sept 14; Depart LAX; Arrive HNL; <= 0 stop; on airline NW |
| Bob | HNL->NYC | Depart Sun, Sept 16; Depart HNL; Ariive JFK; <= 1 stop; on airline AA |
| Joint | NYC->LAX | Ann + Bob on same flights |

After such constraints are derived, rather than re-posing the MPMR query without further steps, it may be desirable to give the user the ability to edit the set of additional constraints prior to submission, in particular so that they may delete constraints. For example, each of the above constraints could be given a toggle switch, or when appropriate, fields (such as maximum number of stops) could be editable; this would enable constraints that might be unnecessary (such as the requirement that Bob's NYC→LAX segment depart from LGA) to be loosened, potentially increasing the number or quality of joint solutions returned.

The process accepts a joint query, and initializes a structure Constraints, initially empty. The process poses the joint query with additional constraints "Constraints" and displays the joint solutions. If a solution S is selected for additional similar answers, the process derives individual or joint constraints C based upon the solution S, allows user to approve or edit the constraint C, adds the edited constraints C to "Constraints" and poses the query.

The individual solutions of a joint solution may be purchased independently using ordinary techniques. It may be more desirable to reserve and purchase tickets using an "atomic" process optimized for the MPMR travel scenario that reserves seats for all passengers prior to purchasing any, so that any booking problems that prevent a single passenger from purchasing a ticket do not cause invalid or incomplete joint solutions to be purchased.

While examples from air travel planning have been described, aspects apply equally well to many other forms of travel planning, such as car or bus or train travel planning, or mixed car and bus and train and air travel planning. Accordingly, other embodiments are within the scope of the following claims.

What is claimed is:

1. A computer-implemented method, for determining multiple routes for multiple passenger groups, the method executed over a computer network, the method comprising:
sending, by a computer to a scheduler computer system that produces itineraries as combinations of flights, in response to travel planning queries, multiple, individual travel planning queries each query including an origin and a destination with a bias produced by the computer based on the multiple, individual travel planning queries and a preference/requirement, to bias the scheduler computer system to produce individual itinerary solutions that meet joint travel requirements for at least two multiple passenger groups with different origins or different destinations to share flights for some portion of a trip segment, with the bias provided to cause the scheduler to initially generate, for at least one of the individual queries, individual itinerary solutions that have intermediate stops that coincide with an origin or destination of at least another one of the individual queries for another one of the multiple passenger groups;

receiving from the scheduler computer system, individual itinerary solutions;

merging, by the computer, the individual itinerary solutions that include itineraries with intermediate stops for at least some of the multiple passenger groups produced from the multiple individual queries with merging being in accordance with those individual itinerary solutions that include common intermediate stops to produce a list of joint itinerary solutions for the passenger groups;

returning the joint itinerary solutions for display on a user interface.

2. The method of claim 1 further comprising:
processing a multiple passenger, multiple route (MPMR) query for a plurality of passenger groups to produce the multiple individual queries.

3. The method of claim 2 wherein the MPMR query comprises a set of information for each passenger group, the set comprising origin and destination information and a set of joint travel requirements, the set of joint travel requirements including a requirement to share flights for some portion of a trip segment, and further comprises at least one additional joint travel requirement selected from the group consisting of arriving or departing an airport at similar times; sharing all flights for a segment of a trip; sharing over-water or international flights for a segment of a trip; sharing as much mileage or time as possible for a segment of a trip; and sharing origin or destination airports or cities.

4. The method of claim 2 wherein a client system sends the MPMR query to a server that processes the MPMR query to produce the multiple individual travel planning queries.

5. The method of claim 1 wherein a server produces a user interface that data is entered into, and the server executes an algorithm to generate the individual travel planning queries and combines the individual itinerary solutions to produce the joint itinerary solutions.

6. The method of claim 1 wherein each individual travel planning query is processed and a list of individual itinerary solutions is produced for each passenger group.

7. The method of claim 6 wherein each of the lists is received, and merging the individual solutions comprises:
producing a cross-product of the lists of individual itinerary solutions to provide a list of potential joint itinerary solutions.

8. The method of claim 6 wherein each of the lists is received, and merging the individual solutions comprises:
filtering the list of potential joint itinerary solutions to eliminate potential joint itinerary solutions from the list of potential joint itinerary solutions that violate other joint travel requirements.

9. The method of claim 1, further comprising:
extracting a set of properties from the joint itinerary solutions; and
re-sending query including an additional requirement that new solutions produced from the scheduler have the same properties as the additional requirement.

10. The method of claim 1 wherein the bias comprises:
for a first one of the multiple passenger groups, generating some itineraries with intermediate points determined from an individual query of a second, different one of the multiple passenger groups.

11. The method of claim 1 wherein the bias is a common bias that is applied across all individual queries.

12. The method of claim 10 wherein the bias is a common bias that is applied across all individual travel planning queries.

13. A computer program product for determining multiple routes for multiple passenger groups, the computer program product tangibly stored on a computer readable storage device, the computer program product comprising instructions for causing a computer to:

produce a bias to bias a scheduler computer system to produce individual itinerary solutions that meet joint travel requirements for at least two multiple passenger groups that have different origins or different destinations to share flights for some portion of a trip segment, with the bias provided to cause the scheduler to initially generate, for at least one of the individual queries, individual itinerary solutions that have intermediate stops that coincide with an origin or destination of at least another one of the individual queries for another one of the multiple passenger groups;

send to a scheduler computer system, multiple individual queries and the produced bias to bias the scheduler computer system to produce individual itinerary solutions that meet the joint travel requirement that calls for at least some of those multiple passenger groups with different origins or destinations to share flights for some portion of a trip segment;

receive from the scheduler computer system the individual itinerary solutions that meet the joint travel requirement that calls for at least some of those multiple passenger groups with different origins or destinations to share flights for some portion of a trip segment;

merge the individual itinerary solutions from the multiple individual queries to produce a list of joint itinerary solutions for the passenger groups; and render the joint itinerary solutions on a display device.

14. The computer program product of claim 13 further comprising instructions to:
process a multiple passenger, multiple route (MPMR) query for a plurality of passenger groups to produce the multiple individual queries.

15. The computer program product of claim 14 wherein the MPMR query comprises a set of information for each passenger group, the set comprising origin and destination information and a set of joint travel requirements, the set of joint travel requirements including a requirement to share flights for some portion of a trip segment and further comprise at least one additional joint travel requirement selected from the group consisting of arriving or departing an airport at similar times; sharing all flights for a segment of a trip; sharing over-water or international flights for a segment of a trip; sharing as much mileage or time as possible for a segment of a trip; and sharing origin or destination airports or cities.

16. The computer program product of claim 15 further comprising instructions to:
produce an interface in which data are entered to provide the set of information for each passenger group.

17. The computer program product of claim 13 wherein the instructions to merge combine the individual itinerary solutions to produce the joint itinerary solutions and a list of individual itinerary solutions for each passenger group.

18. The computer program product of claim 17 further comprising instructions to:
produce a cross-product of lists of individual itinerary solutions to provide a list of potential joint itinerary solutions.

19. The computer program product of claim 18 further comprises instructions to:
filter the list of potential joint itinerary solutions to eliminate potential joint itinerary solutions from the list of potential joint itinerary solutions that violate joint travel requirements.

20. The computer program product of claim 13, further comprising instructions to:
extract a set of properties from the joint itinerary solutions; and
re-send query including an additional requirement that new solutions produced from the scheduler have the same properties as the additional requirement.

21. The computer program product of claim 13 further comprising instructions to:
generate for a first one of the multiple passenger groups, some itineraries with intermediate points determined from an individual query of a second, different one of the multiple passenger groups.

22. The computer program product of claim 13 wherein the bias is a common bias that is applied across all individual queries.

23. Apparatus, comprising:
a processor coupled to a memory; and
storage, storing a computer program product for determining multiple routes for multiple passenger groups, the computer program product comprising instructions for causing the processor to:
produce a bias to bias a scheduler computer system to produce individual itinerary solutions that meet joint travel requirements for at least two multiple passenger groups that have different origins or different destinations to share flights for some portion of a trip segment, with the bias provided to cause the scheduler to initially generate, for at least one of the individual queries, individual itinerary solutions that have intermediate stops that coincide with an origin or destination of at least another one of the individual queries for another one of the multiple passenger groups;
send to a scheduler computer system, multiple individual queries and the produced bias to bias the scheduler computer system to produce individual itinerary solutions that meet joint travel requirements that call for at least some of those multiple passenger groups with different origins or destinations to share flights for some portion of a trip segment;
receive from the scheduler computer system the individual itinerary solutions;
merge the individual itinerary solutions produced in response to the multiple individual queries to produce a list of joint itinerary solutions for the passenger groups; and
render the joint itinerary solutions on a display device.

24. The apparatus of claim 23, wherein the processor executes instructions to:
process a multiple passenger, multiple route (MPMR) query for a plurality of passenger groups to produce the multiple individual queries.

25. The apparatus of claim 24, wherein the MPMR query comprises a set of information for each passenger group, the set comprising origin and destination information and a set of joint travel requirements, the set of joint travel requirements including a requirement to share flights for some portion of a trip segment and further comprise at least one additional joint travel requirement selected from the group consisting of arriving or departing an airport at similar times; sharing all flights for a segment of a trip; sharing over-water or international flights for a segment of a trip; sharing as much mileage or time as possible for a segment of a trip; and sharing origin or destination airports or cities.

26. The apparatus of claim 25, wherein the processor executes instructions to:
produce an interface in which data are entered to provide the set of information for each passenger group.

27. The apparatus of claim 25, wherein the processor executes instructions to:
combine the individual itinerary solutions to produce the joint itinerary solutions and a list of individual itinerary solutions for each passenger group.

28. The apparatus of claim 27, wherein the processor executes instructions to:
produce a cross-product of lists of individual itinerary solutions to provide a list of potential joint itinerary solutions.

29. The apparatus of claim 28, wherein the processor executes instructions to:
filter the list of potential itinerary joint solutions to eliminate those potential joint itinerary solutions from the list of potential joint itinerary solutions that violate joint travel requirements.

30. The apparatus of claim 23, wherein the processor executes instructions to:
extract a set of properties from the joint itinerary solutions; and
re-send query including an additional requirement that new solutions produced from the scheduler have the same properties as the additional requirement-the joint travel requirements include a requirement that multiple passenger groups with different trip segment origins or destinations share flights for some portion of a trip.

31. The apparatus of claim 23, wherein the processor executes instructions to:
generate for a first one of the multiple passenger groups, some itineraries with intermediate points determined from an individual query of a second, different one of the multiple passenger groups.

* * * * *

UNITED STATES PATENT AND TRADEMARK OFFICE
CERTIFICATE OF CORRECTION

PATENT NO. : 8,005,695 B2  Page 1 of 1
APPLICATION NO. : 11/335169
DATED : August 23, 2011
INVENTOR(S) : Carl G. De Marcken It is certified that error appears in the above-identified patent and that said Letters Patent is hereby corrected as shown below:

In Claim 9, column 29, line 65, after "re-sending" insert --the--.

Signed and Sealed this
Twenty-fifth Day of October, 2011

David J. Kappos
*Director of the United States Patent and Trademark Office*